(12) United States Patent  
Ohtsuka et al.

(10) Patent No.: US 8,480,311 B2
(45) Date of Patent: Jul. 9, 2013

(54) OPTICAL CONNECTOR, METHOD OF ATTACHING THE OPTICAL CONNECTOR TO COATED OPTICAL FIBER, AND OPTICAL CONNECTION MEMBER

(75) Inventors: Kenichiro Ohtsuka, Kanagawa (JP); Masahiro Hamada, Kanagawa (JP); Masaki Ohmura, Kanagawa (JP); Mitsuaki Tamura, Kanagawa (JP); Mitsuru Kihara, Tokyo (JP); Ryo Koyama, Tokyo (JP); Hitoshi Son, Tokyo (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 525 days.

(21) Appl. No.: 12/670,581

(22) PCT Filed: Oct. 24, 2008

(86) PCT No.: PCT/JP2008/069357
§ 371 (c)(1),
(2), (4) Date: Jan. 25, 2010

(87) PCT Pub. No.: WO2009/066542
PCT Pub. Date: May 28, 2009

(65) Prior Publication Data
US 2010/0220960 A1 Sep. 2, 2010

(30) Foreign Application Priority Data

Nov. 20, 2007 (JP) .................. 2007-300539

(51) Int. Cl.
*G02B 6/245* (2006.01)
*G02B 6/36* (2006.01)

(52) U.S. Cl.
USPC ............... 385/78; 385/72; 385/134; 385/147

(58) Field of Classification Search
None
See application file for complete search history.

(56) References Cited

U.S. PATENT DOCUMENTS 3,309,947 A 8/1965 Denney
3,861,781 A 1/1975 Hasegawa et al.
(Continued)

FOREIGN PATENT DOCUMENTS

JP 40-15065 7/1965
JP 49-65244 6/1974
(Continued)

OTHER PUBLICATIONS

Japanese Notification of Reason for Refusal, w/ English translation thereof, issued in Japanese Patent Application No. JP 2007-137200 dated Apr. 26, 2011.

(Continued)

*Primary Examiner* — Mike Stahl
(74) *Attorney, Agent, or Firm* — McDermott Will & Emery LLP

(57) ABSTRACT

An optical connector in which works of attaching an incorporated optical fiber to a ferrule, removing a coating of the tip end side of a coated optical fiber, and attaching an optical connector to the coated optical fiber can be made more efficient, and the transmission characteristics can be prevented from being lowered in the optical connector, and a method of attaching the optical connector to a coated optical fiber are provided.

An optical connector 101 includes: a ferrule 140 into which a glass fiber 121 that is obtained by peeling a coating 124 of a coated optical fiber 120 is to be inserted; a fixing portion 130 which fixes the coated optical fiber 120 inserted into the ferrule 140; and a coating-removing portion 110 which removes the coating 124 from an end portion of the coated optical fiber 120, by means of a force of inserting the coated optical fiber 120 into the optical connector 101.

21 Claims, 24 Drawing Sheets

U.S. PATENT DOCUMENTS

| | | | |
|---|---|---|---|
| 4,023,886 | A | 5/1977 | Nakayama et al. |
| 4,822,131 | A | 4/1989 | Anderton |
| 4,824,198 | A | 4/1989 | Anderton |
| 5,694,506 | A | 12/1997 | Kobayashi et al. |
| 5,909,528 | A | 6/1999 | Tamekuni et al. |
| 2005/0213893 | A1 | 9/2005 | Hamasaki et al. |
| 2006/0039658 | A1 | 2/2006 | Furuyama et al. |
| 2006/0269192 | A1 | 11/2006 | Hayasaka |

FOREIGN PATENT DOCUMENTS

| | | |
|---|---|---|
| JP | 50-156448 | 12/1975 |
| JP | 58-146211 | 10/1983 |
| JP | 61-26010 | 2/1986 |
| JP | 2-3502 | 1/1990 |
| JP | 2-93407 | 4/1990 |
| JP | 7-019709 | 4/1995 |
| JP | 08-201652 | 8/1996 |
| JP | 8-248254 | 9/1996 |
| JP | 9-127367 | 5/1997 |
| JP | 9-127371 | 5/1997 |
| JP | 11-160563 | 6/1999 |
| JP | 11-258430 | 9/1999 |
| JP | 11-295533 | 10/1999 |
| JP | 11-326645 | 11/1999 |
| JP | 11-352335 | 12/1999 |
| JP | 2000-193831 | 7/2000 |
| JP | 2001-208936 | 8/2001 |
| JP | 2001-330736 | 11/2001 |
| JP | 2002-199536 | 7/2002 |
| JP | 2002-341148 | 11/2002 |
| JP | 2005-114860 | 4/2005 |
| JP | 2005-115269 | 4/2005 |
| JP | 2005-208220 | 8/2005 |
| JP | 2005-309367 | 11/2005 |
| JP | 2005-345753 | 12/2005 |
| JP | 2006-003661 | 1/2006 |
| JP | 2006-284613 | 10/2006 |
| JP | 2006-337520 | 12/2006 |
| JP | 2007-108358 | 4/2007 |
| JP | 2008-292706 | 12/2008 |
| JP | 2008-292709 | 12/2008 |

OTHER PUBLICATIONS

Japanese Information Offer Form, and English translation thereof, issued in Japanese Patent Application No. 2007-137200 dated Oct. 14, 2011.

Japanese Notification of Reasons for Refusal, and English Translation thereof, issued in Japanese Patent Application No. 2007-137200 dated Nov. 8, 2011.

Japanese "Submission of Publication and the Like", and English translation thereof, dated Mar. 29, 2012.

Office Action issued in Japanese Patent Application No. 2007-300539 dated Apr. 9, 2013.

FIG. 6
(A)
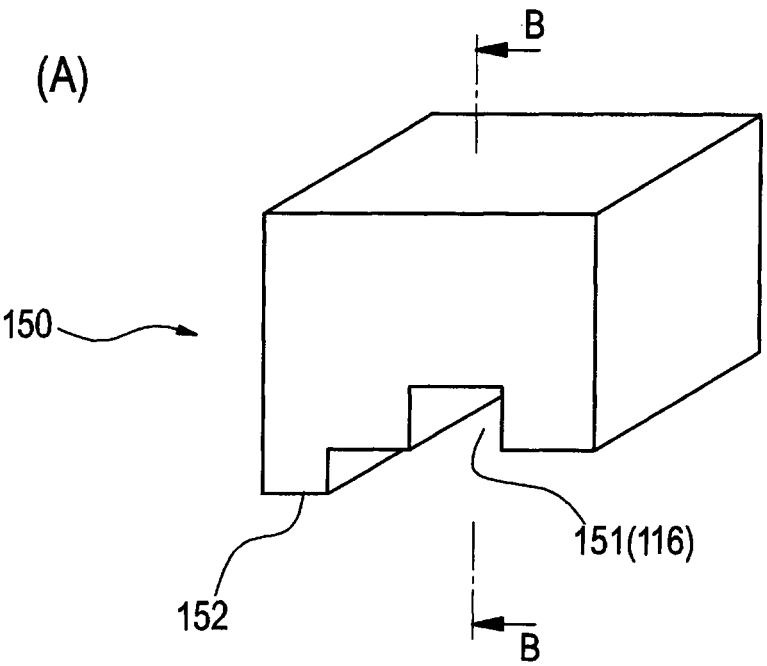
(B)
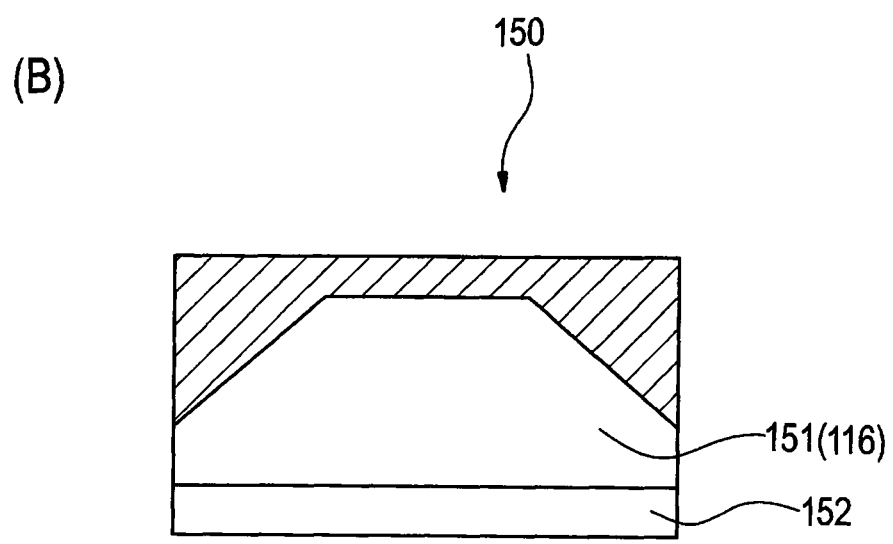

FIG. 8
(A)
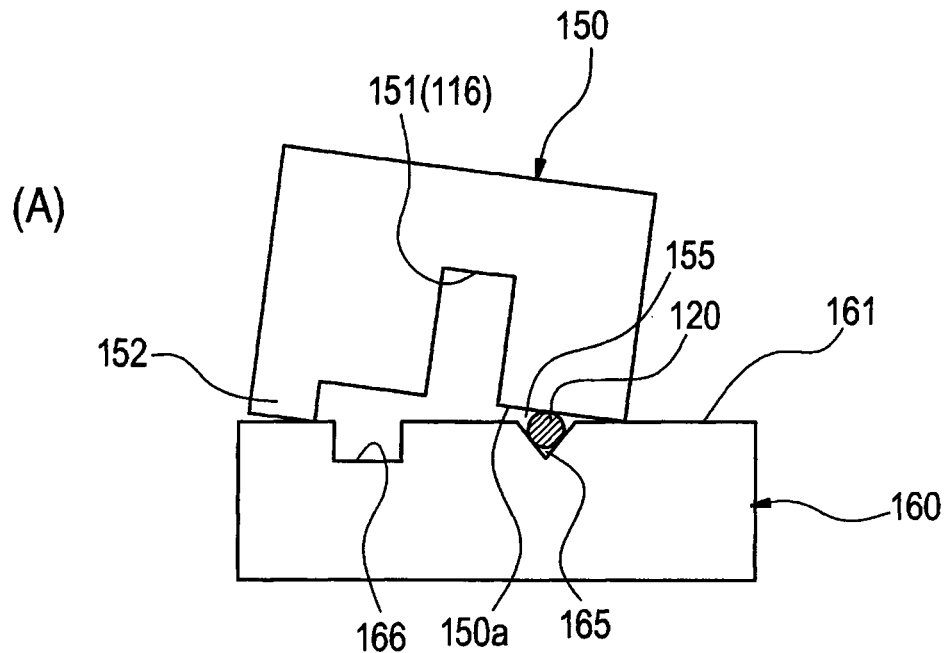
(B)
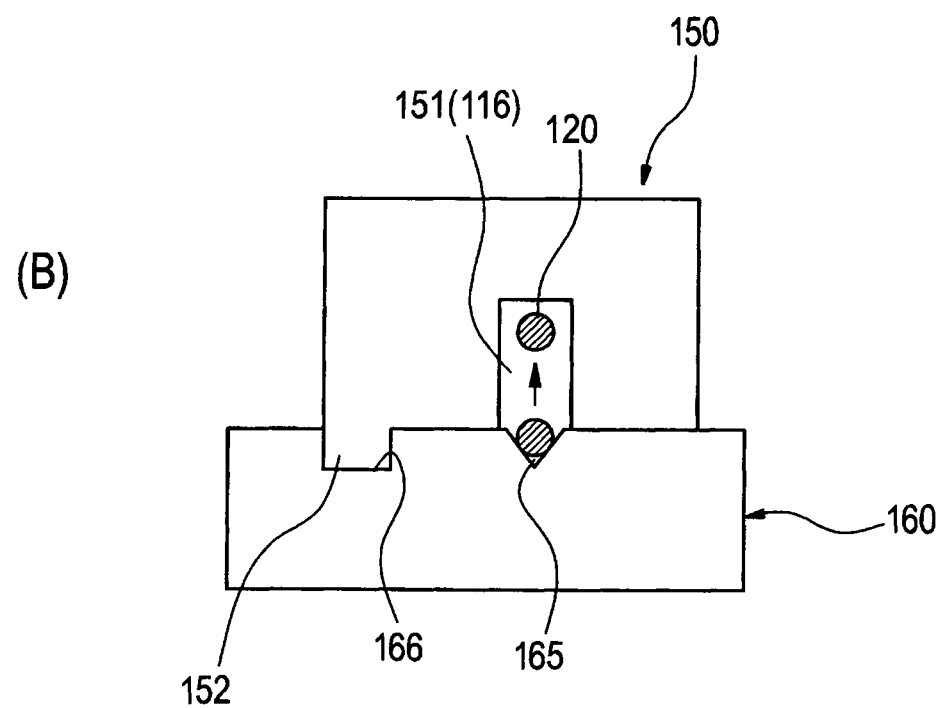

FIG. 12
(A)
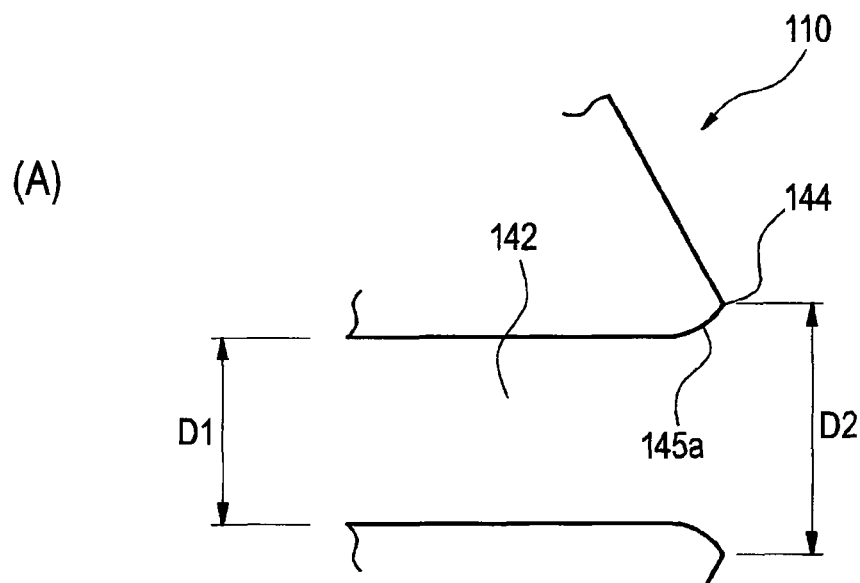
(B)
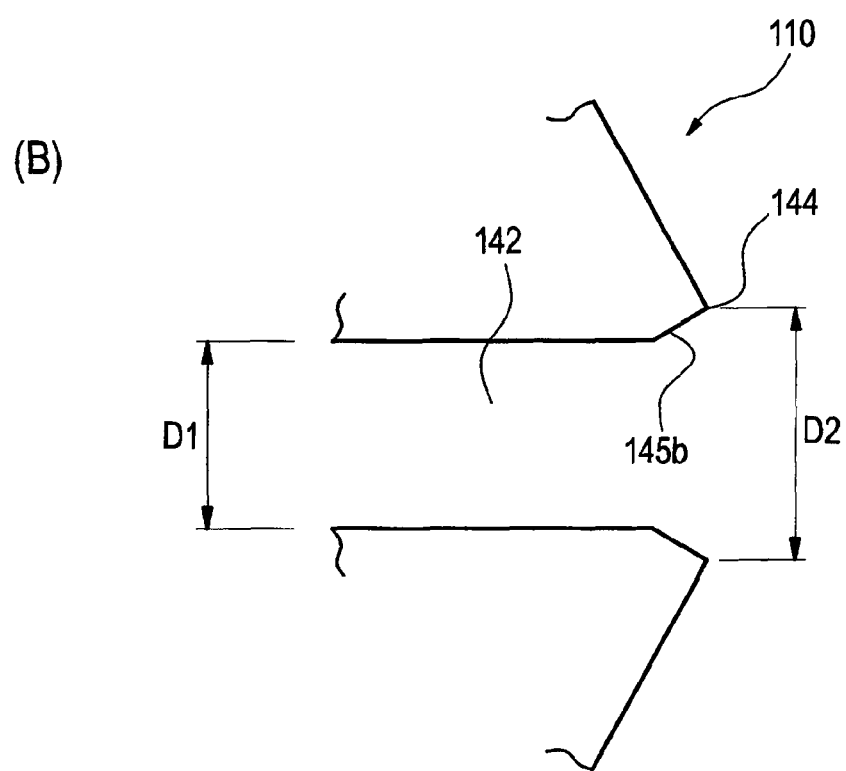

FIG. 13
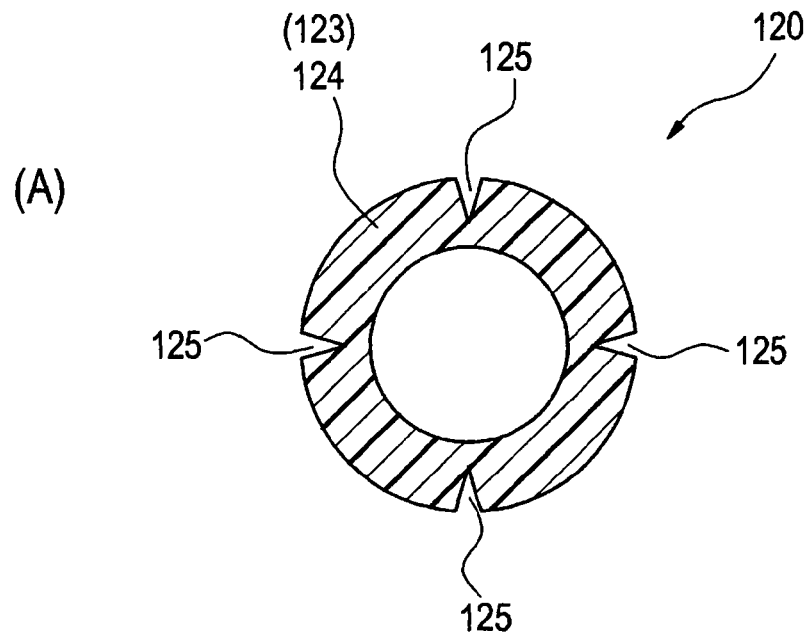
(A)
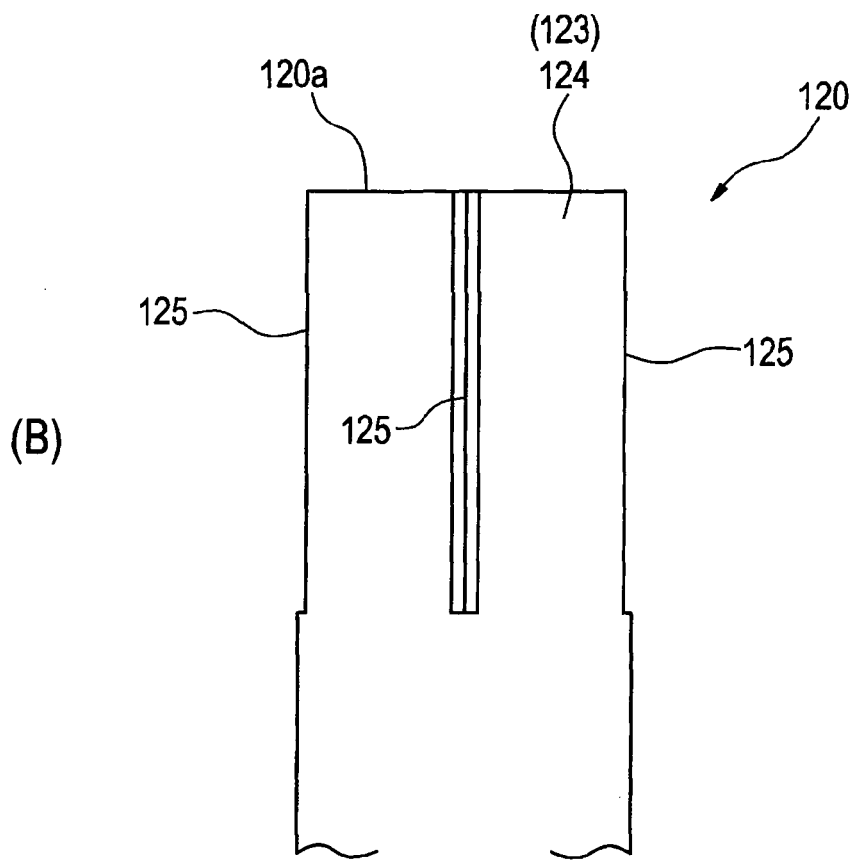
(B)

FIG. 14
(A)
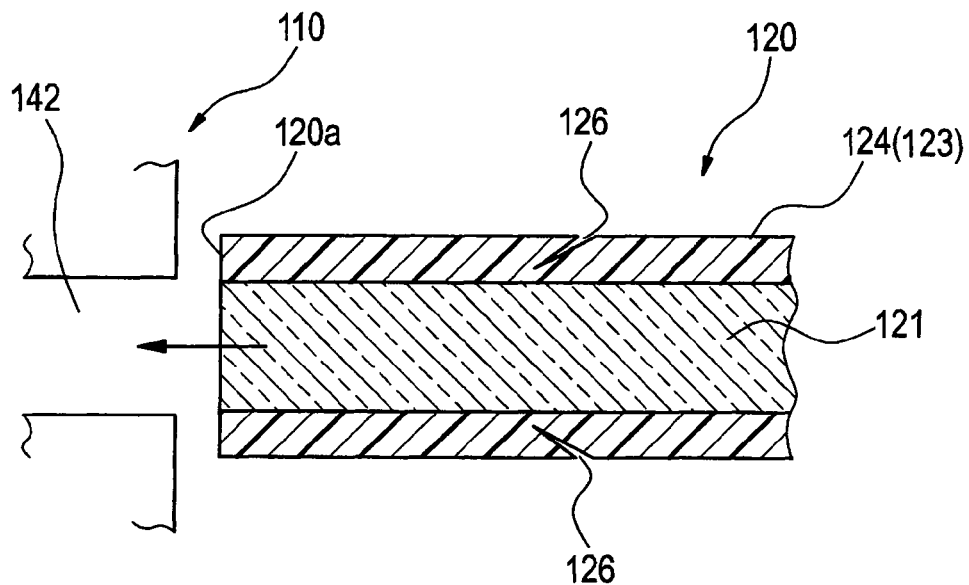
(B)
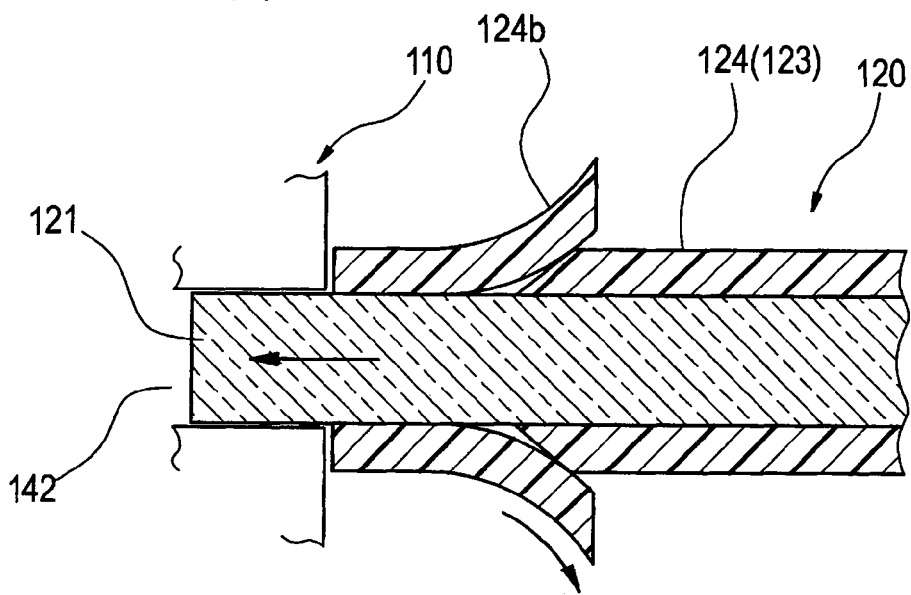

OPTICAL CONNECTOR, METHOD OF ATTACHING THE OPTICAL CONNECTOR TO COATED OPTICAL FIBER, AND OPTICAL CONNECTION MEMBER

RELATED APPLICATIONS

This application is the U.S. National Phase under 35 U.S.C. §371 of International Application No. PCT/JP2008/069357, filed on Oct. 24, 2008, which in turn claims the benefit of Japanese Application No. 2007-300539, filed on Nov. 20, 2007, the disclosures of which Applications are incorporated by reference herein.

TECHNICAL FIELD

The present invention relates to an optical connector, a method of attaching the optical connector to a coated optical fiber, and an optical connection member.

BACKGROUND ART

FIG. 26 shows a conventional example of an optical connector which is to be connected to a coated optical fiber.

The optical connector 201 shown in the figure is disclosed in Patent Reference 1 below, and includes: a ferrule 203 which incorporates a short first incorporated optical fiber (bare optical fiber) 202; and a splice member 204 which holds the ferrule 203 and the incorporated optical fiber 202 that is projected from the rear end face of the ferrule 203. The optical connector 201 has a configuration where a coated optical fiber 219 is introduced from the rear side into the splice member 204, the incorporated optical fiber 202 is butted against a bare optical fiber 220 which is exposed from the tip end of the coated optical fiber 219, and the splice member 204 is clamped to be fixed to the coated optical fiber 219.

In order to prevent the transmission characteristics of the connecting portion of the bare optical fibers from being lowered, a first refractive index matching material 221 is injected into a region where the rear end face of the incorporated optical fiber 202 and the front end face of the bare optical fiber 220 are butted against each other, and a second refractive index matching material 222 is injected into a bare-optical fiber introducing portion 210 disposed in the splice member 204.

Patent Reference 1: JP-A-11-160563

DISCLOSURE OF THE INVENTION

Problems that the Invention is to Solve

When the above-mentioned optical connector 201 is to be attached to the coated optical fiber 219, however, a coating removing work in which the portion of the bare optical fiber 220 is previously formed in the tip end side of the coated optical fiber 219 in accordance with the length of the optical fiber path in the splice member 204 is required. There is a problem in that the work of attaching the connector in the site requires much trouble.

In the case where a coated optical fiber is connected in an optical connector with an incorporated optical fiber without removing the coating in the tip end of the coated optical fiber, it is not required to dispose a step of removing the coating, and there is an advantage that the connecting work in the site is simple. However, the coated optical fiber is positioned with reference to the outer circumferential face of the coating, and hence there is a possibility that the optical axes of the connecting portions are deviated from each other by deformation of the coating to cause a connection loss.

An object of the invention relates to solving the above-discussed problems. It is an object to provide an optical connector in which works of attaching an incorporated optical fiber to a ferrule, removing a coating of the tip end side of a coated optical fiber, and attaching an optical connector to the coated optical fiber can be made more efficient, and the transmission characteristics can be prevented from being lowered in the optical connector, and a method of attaching the optical connector to a coated optical fiber.

Means for Solving the Problems

The optical connector of the invention which can solve the above-discussed problems is an optical connector which is to be attached to a coated optical fiber, wherein the optical connector includes:

a ferrule into which a bare optical fiber that is obtained by peeling a coating of the coated optical fiber is to be inserted;

a fixing portion which fixes the coated optical fiber inserted into the ferrule; and a coating-removing portion which removes the coating from an end portion of the coated optical fiber, by means of a force of inserting the coated optical fiber into the optical connector.

In the optical connector of the invention, preferably, the coating-removing portion is an insertion port for the bare optical fiber in the ferrule.

The insertion port has a diameter which is larger than an outer diameter of the bare optical fiber, and which is smaller than an outer diameter of the coating.

In the optical connector of the invention, preferably, the optical connector further includes a flexure space which can house the coated optical fiber in a state where the coated optical fiber is flexed, between the fixing portion and the coating-removing portion.

Preferably, the optical connector further includes a guide capillary which restricts a radial movement of the coated optical fiber, between the coating-removing portion and the flexure space.

In the optical connector of the invention, preferably, the ferrule includes an optical member which is to communicate with the inserted bare optical fiber.

Preferably, the optical member is a short optical fiber which is fixed to an inside of the ferrule.

Preferably, the optical member is a thin film which is disposed in an end portion of the ferrule.

In the optical connector of the invention, preferably, an optical fiber holding hole in which the coated optical fiber is to be passed and fixed is formed in the ferrule, and the optical fiber holding hole includes: a first hole portion which is to house the coated optical fiber; a second hole portion which is to house the bare optical fiber that is obtained by peeling the coating of the coated optical fiber; and a coating-receiving portion which is located between the first hole portion and the second hole portion, and which is to house the peeled coating.

Preferably, the coating-receiving portion is formed in a space which is larger than the first hole portion.

Preferably, the coating-removing portion is formed in an end portion of the second hole portion which faces the coating-receiving portion.

Preferably, a tip end of the coating-removing portion is formed into an acute-angled shape.

Preferably, a tip end of the coating-removing portion has a conical or pyramidal shape.

In the optical connector of the invention, preferably, an inner circumferential face of an end portion of the second hole portion is a tapered face which is gradually inclined from an opening position having a dimension that is larger than an outer diameter of the bare optical fiber to be inserted into second hole portion, and that is smaller than an outer diameter of the coated optical fiber.

In the optical connector of the invention, preferably, the first hole portion and the second hole portion are formed in separate components, respectively.

Preferably, a coating-removing component in which the second hole portion is formed is fitted into a fitting hole of a body of the ferrule in which the first hole portion is formed, and the coating-receiving portion is formed between a tip end face of the coating-removing component and a bottom face of the fitting hole.

In the optical connector of the invention, preferably, the coating-receiving portion is formed in a space having a rectangular sectional shape or a cross sectional shape.

In the optical connector of the invention, preferably, in the ferrule, the coating-receiving portion is formed by a vertical hole which perpendicularly intersects with the optical fiber holding hole between the first hole portion and the second hole portion.

The method of attaching an optical connector to a coated optical fiber of the invention is a method of attaching the optical connector of the invention to a coated optical fiber, wherein the method includes the steps:

inserting a coated optical fiber into the optical connector;

butting a tip end of the coated optical fiber against the coating-removing portion to peel a coating of a tip end side; and inserting a bare optical fiber which is exposed by peeling the coating, into the ferrule.

The method of attaching an optical connector to a coated optical fiber of the invention is a method of attaching the optical connector of the invention to a coated optical fiber, wherein the method includes the steps:

inserting a coated optical fiber into the first hole portion of the optical fiber holding hole;

butting a tip end of the coated optical fiber against the coating-removing portion to peel a coating of a tip end side, and housing the peeled coating in the coating-receiving portion; and inserting a bare optical fiber which is exposed by peeling the coating, into the second hole portion.

The optical connection member of the invention is an optical connection member which is to be attached to a coated optical fiber, wherein the optical connection member includes:

a connecting portion into which a bare optical fiber that is obtained by peeling a coating of the coated optical fiber is to be inserted;

a fixing portion which fixes the coated optical fiber inserted into the connecting portion; and a coating-removing portion which removes the coating from an end portion of the coated optical fiber, by means of a force of inserting the coated optical fiber into the optical connection member, and the coating-removing portion is disposed on both axial sides of the connecting portion.

Effects of the Invention

According to the optical connector of the invention, when a coated optical fiber is to be inserted into an optical connector, the coating is removed from an end portion of the optical fiber by the coating-removing portion, the bare optical fiber which is exposed in the end portion is inserted into the ferrule, and the coated optical fiber can be fixed by the fixing portion. Therefore, it is not required to perform a coating removing work before the insertion into the optical connector, and the coated optical fiber can be connected to another optical fiber or the like while being accurately positioned in the ferrule with reference to the outer circumferential face of the bare optical fiber.

Moreover, the work of attaching an optical fiber to a coated optical fiber in the site can be simplified, and made more efficient.

BRIEF DESCRIPTION OF THE DRAWINGS

FIG. 6(A) is a perspective view of a lid member which forms a flexure space, and FIG. 6(B) is a sectional view at position B-B in FIG. 6(A).

FIG. 8(A) is a sectional view showing the lid member in insertion of an optical fiber, and FIG. 8(B) is a sectional view showing the lid member in formation of the flexure space.

FIG. 12(A) is a sectional view showing an R chamfer disposed in an insertion hole of the ferrule, and FIG. 12(B) is a sectional view showing a C chamfer disposed in the insertion hole.

FIG. 13(A) is a sectional view of an optical fiber in which initial flaws are formed in a coating, and FIG. 13(B) is a front view of the optical fiber.

FIG. 14(A) is a sectional view of an optical fiber in which an initial flaw is formed in a coating, and FIG. 14(B) is a sectional view showing a state where the optical fiber is pressed against the insertion hole.

DESCRIPTION OF REFERENCE NUMERALS AND SIGNS

19 . . . coated optical fiber, 19a . . . extra length (flexure portion), 19b . . . peeled coating, 20 . . . bare optical fiber, 31 . . . optical connector, 33 . . . body portion, 37 . . . optical fiber holding hole, 38 . . . ferrule, 38A . . . member, 42 . . . base member, 44 . . . extra-length housing lid member, 45 . . . fixing lid member, 46 . . . clamp member, 47 . . . fiber passing portion, 51 . . . extra-length housing space, 53 . . . first hole portion, 55 . . . second hole portion, 57 . . . coating-receiving portion, 61 . . . coating-removing portion, 67 . . . ferrule body, 68 . . . fitting hole, 68a . . . bottom face, 69 . . . coating-removing component, 69a . . . tip end face, 73 . . . vertical hole, 73A . . . continuous round hole, 73B . . . molded hole, 101, 101B, 101C . . . optical connector, 101D, 101E . . . mechanical splice (optical connection member), 110 . . . coating-removing portion, 116 . . . flexure space, 117 . . . guide capillary, 118 . . . thin film (optical member), 120 . . . optical fiber (coated optical fiber), 120a . . . end face, 121 . . . glass fiber (bare optical fiber), 124 . . . coating, 124a . . . end face of coating, 130 . . . fixing portion, 140 . . . ferrule (connecting portion), 140B . . . connecting capillary (connecting portion), 141 . . . short optical fiber (optical member), 142 . . . glass fiber insertion hole, 142a . . . insertion port, D1 . . . diameter of insertion port, d1 . . . outer diameter of optical fiber (outer diameter of coating), d2 . . . outer diameter of first coating layer, d3 . . . outer diameter of glass fiber

BEST MODE FOR CARRYING OUT THE INVENTION

Hereinafter, examples of embodiments of the optical connector of the invention, and the method of attaching the optical connector to a coated optical fiber will be described with reference to the drawings.
(First Embodiment)

Figure 1:
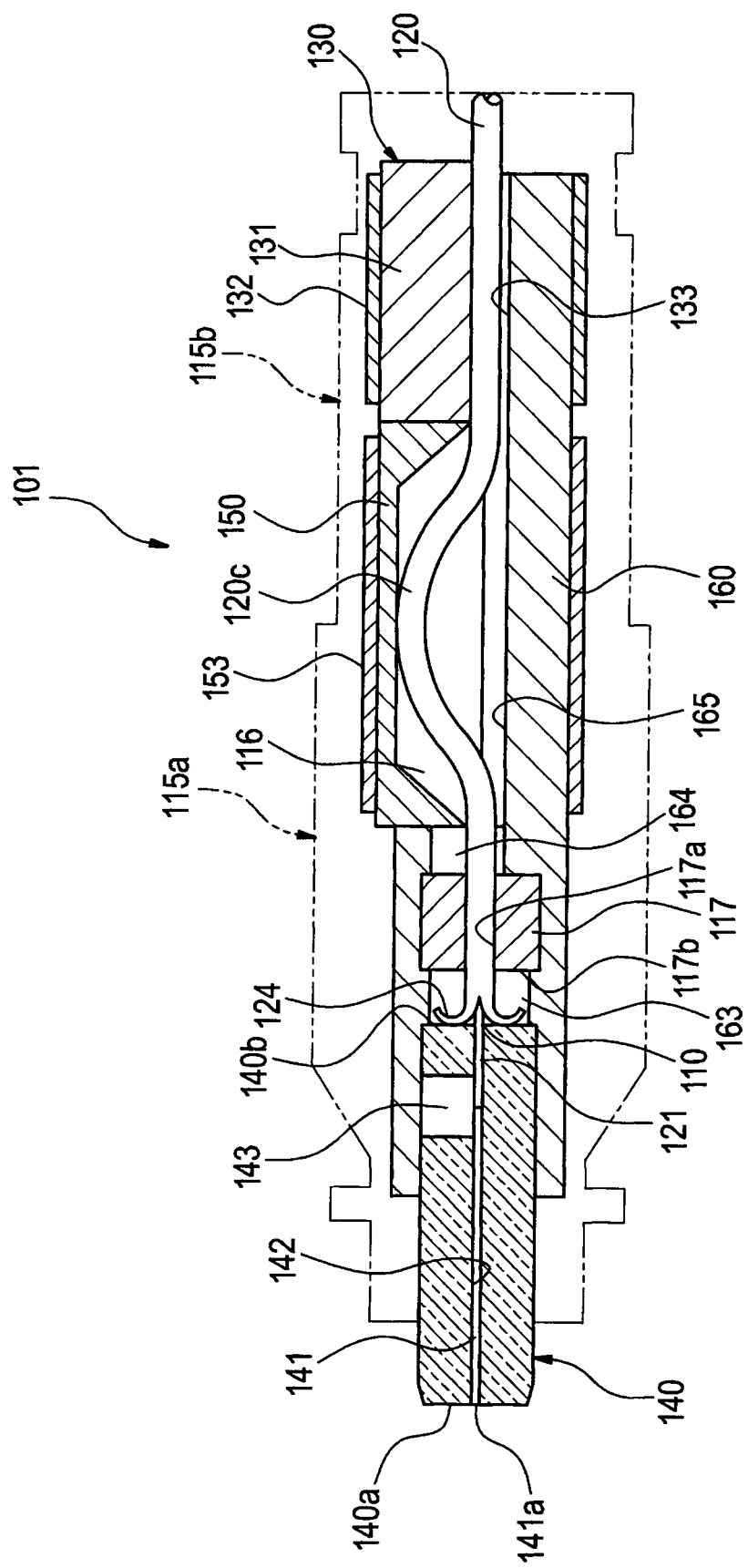
FIG. 1 is a sectional view showing an example of an embodiment of the optical connector of the invention.
Figure 2:
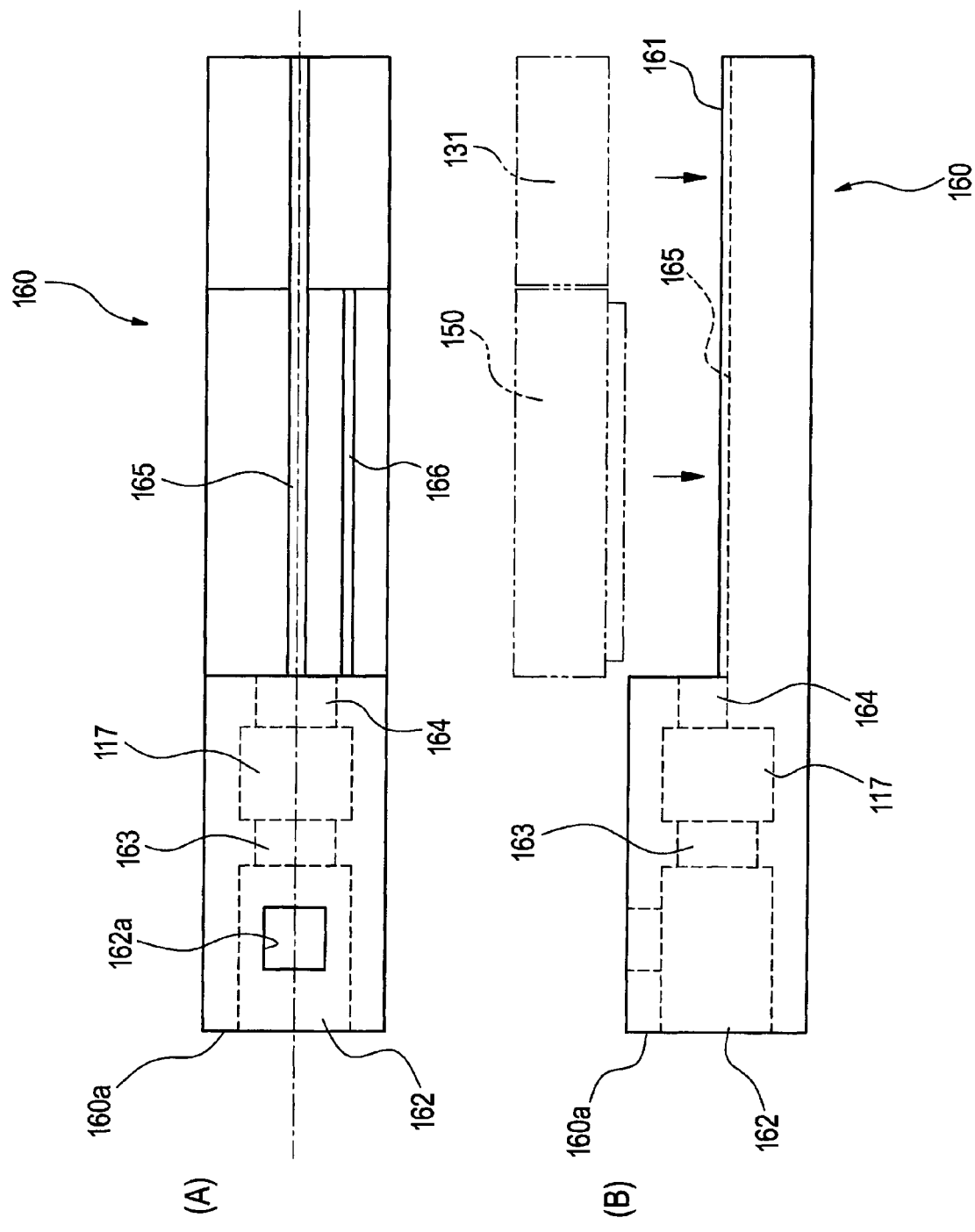
FIG. 2(A) is a plan view of a base member shown in FIG. 1.
FIG. 2(B) is a side view of the base member.

FIG. 1 is a sectional view of the optical connector of the embodiment, FIG. 2 shows a base member in the optical connector of FIG. 1, FIG. 2(A) is a plan view, and FIG. 2(B) is a side view.

As shown in FIG. 1, the optical connector 101 of the embodiment is an optical connector which can be attached to a coated optical fiber in the working site, and has: a ferrule 140 which is a connecting portion including a short optical fiber 141 functioning as an optical member in the tip end side (the left end side in FIG. 1), and having a glass fiber insertion hole 142 which communicates with the short optical fiber 141; and a fixing portion 130 which performs fixation in a state where the tip end face of an optical fiber 120 inserted into the glass fiber insertion hole 142 is butted against the rear end face (the right end face in FIG. 1) of the short optical fiber 141. Inside the optical connector 101, a coating-removing portion 110 is disposed which, when the optical fiber (coated optical fiber) 120 including a coating 124 on the outer circumference of a glass fiber (bare optical fiber) 121 is inserted into the optical connector 101, removes the coating 124 from an end portion of the optical fiber 120 by an insertion force.

As shown in FIG. 2, a base member 160 of the optical connector 101 has, for example, a rectangular prismatic columnar shape as a whole, and an intermediate face 161 which is formed by planarly cutting away the upper half (the upper half in FIG. 2(B)) is formed in a range from the middle portion to the rear portion (the right side portion in FIG. 2). In the middle of the intermediate face 161, a V groove 165 for positioning the coated optical fiber 120 is formed along the insertion direction of the optical fiber 120. A lid 131 of a fixing portion 130, and a lid member 150 for forming a flexure space 116 are attached from the upper side to the intermediate face 161. In the vicinity of a side end portion of the intermediate face 161, a recess 166 is disposed in parallel to the V groove 165 in correspondence to the region where the lid member 150 is attached.

In a front end portion (a left end portion in FIG. 2) of the base member 160, by contrast, a ferrule attaching hole 162 is formed with being directed from the front end face 160a of the base member 160 to the middle. A cutaway 162a which is opened in the upper face of the base member 160 is disposed in the upper side of the ferrule attaching hole 162. A guide capillary 117 is incorporated through a coating-removing space 163 in the middle side (the right side in FIG. 2) of the ferrule attaching hole 162, and a space 164 is disposed between the guide capillary 117 and the intermediate face 161.

Figure 3:
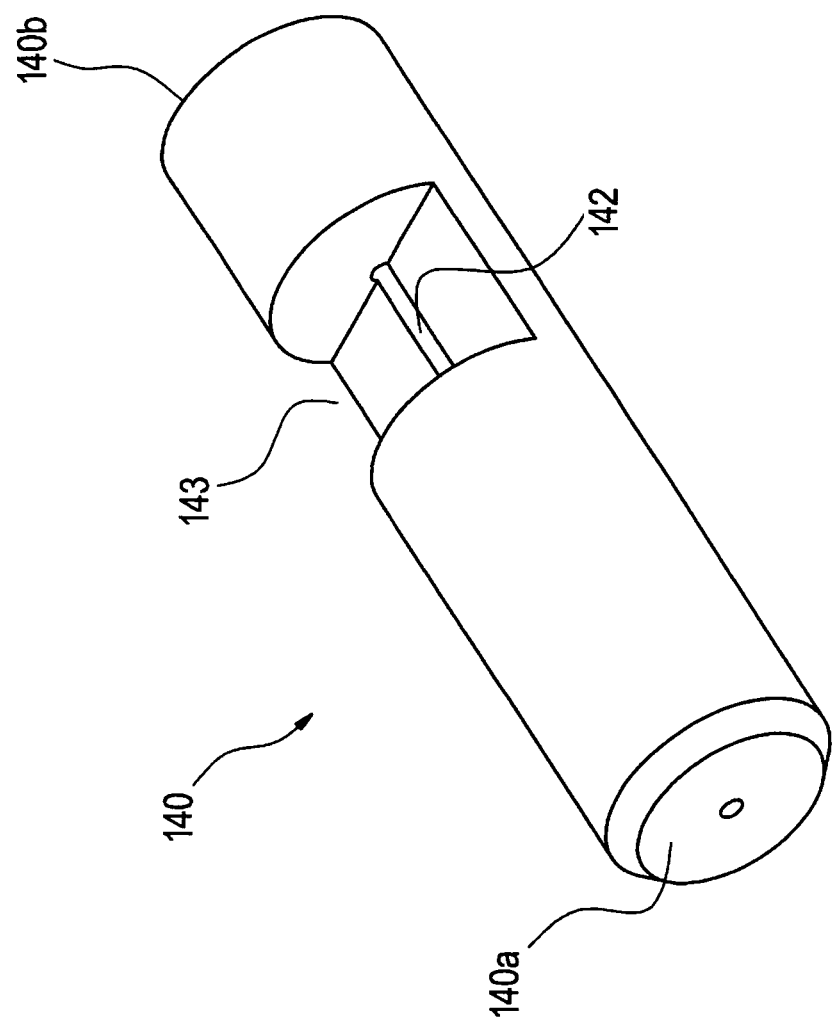
FIG. 3 is a perspective view of a ferrule shown in FIG. 1.

FIG. 3 is a perspective view of the ferrule, FIG. 4(A) is a sectional view of the ferrule, FIG. 4(B) is a sectional view at position B-B in FIG. 4(A), and FIG. 4(C) is a sectional view at position C-C in FIG. 4(A).

Figure 4:
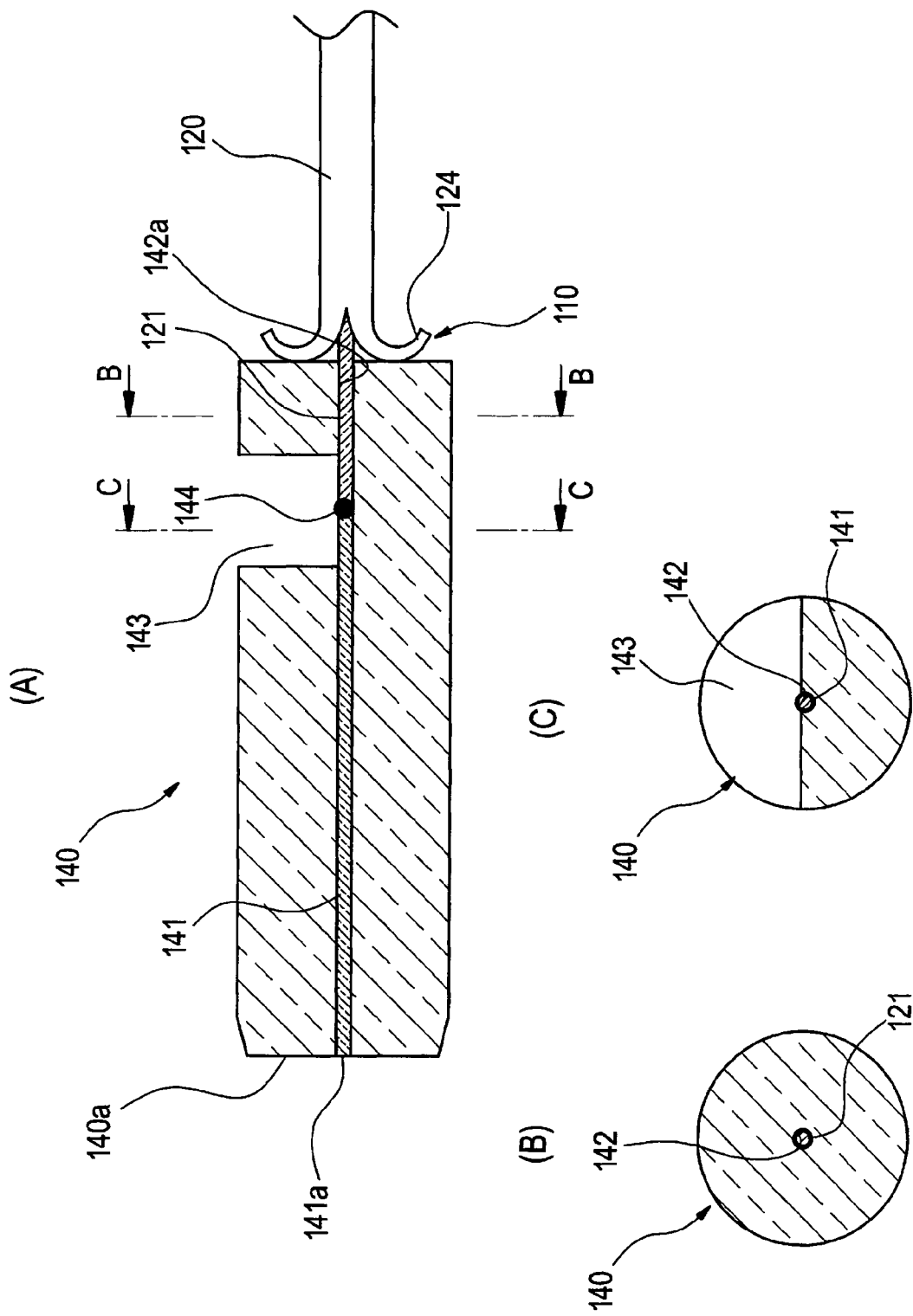
FIG. 4(A) is a sectional view of the ferrule shown in FIG. 1.
FIG. 4(B) is a sectional view at position B-B in FIG. 4(A)
FIG. 4(C) is a sectional view at position C-C in FIG. 4(A).

As shown in FIG. 3, the ferrule (connecting portion) 140 is a member having a substantially columnar shape, and a glass fiber insertion hole 142 in which the inner diameter D1 (see FIG. 5) is slightly larger than the outer diameter d3 of the glass fiber 121 is disposed at the center in the axial direction. A cutaway 143 is disposed in the vicinity of the rear portion of the ferrule 140, and the glass fiber insertion hole 142 is exposed. As shown in FIG. 4(C), the glass fiber insertion hole 142 in the cutaway 143 is set to have a size (a C-like section shape) which covers at least a half of the short optical fiber 141 and the glass fiber 121. When the ferrule 140 is fitted into the ferrule attaching hole 162 of the base member 160, the cutaway 143 is located below the cutaway 162a disposed in the base member 160, and hence the glass fiber insertion hole 142 can be seen from the outside through the cutaways 143, 162a. As shown in FIG. 4, the short optical fiber 141 which is an optical member is a non-coating glass fiber, inserted into the glass fiber insertion hole 142 so that the front end face 141a is coincident with the tip end face 120a of the ferrule 140, and the rear end face is exposed in the cutaway 143, and fixed by an adhesive agent.

Namely, the butt connecting face between the short optical fiber 141 and the glass fiber 121 is exposed in the cutaway 143 and the cutaway 162a, and hence a refractive index matching material 144 can be easily introduced into the connecting face. Therefore, the loss and reflection of transmission light in the connecting face can be reduced. When the glass fiber 121 is to be introduced into the glass fiber insertion hole 142 and pressed against the short optical fiber 141, the air can escape through the cutaways 143, 162a, and hence the resistance due to compression of the air is not generated so that the connection can be smoothly performed. As shown in FIG. 1, the ferrule 140 is attached to the ferrule attaching hole 162 in the front end of the base member 160, and the ferrule 140 and the front portion of the base member 160 are housed in a front housing 115a.

Figure 5:
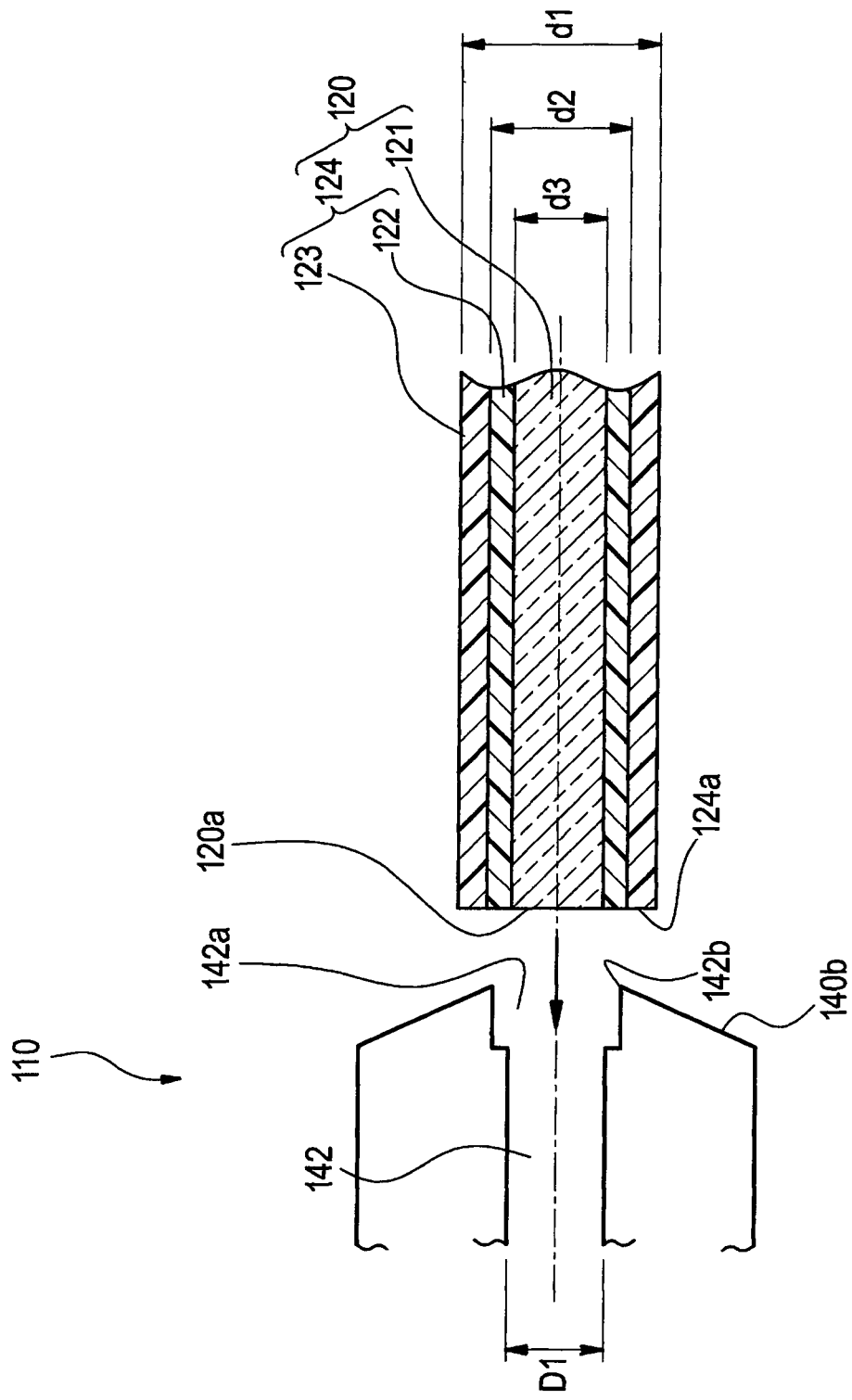
FIG. 5 is an enlarged sectional view of a coating-removing portion shown in FIG. 1.

FIG. 5 is an enlarged sectional view of the coating-removing portion.

As shown in FIG. 5, an insertion port 142a of the glass fiber insertion hole 142 in the rear end face 140b of the ferrule 140 is configured as the coating-removing portion 110. The coating-removing portion 110 presses the end face 124a of the coating 124 in the end face 120a of the optical fiber 120 having the coating 124 in the outer circumference of the glass fiber 121, whereby the coating 124 is peeled and removed from the glass fiber 121.

The optical fiber 120 has in the center the glass fiber 121 having, for example, an outer diameter d3=125 μm. The coating 124 having an outer diameter d1=250 μm is disposed so as to cover the outer circumference of the glass fiber. The glass fiber 121 is a glass fiber having a core and one or more cladding layers. Also a glass fiber having any refractive index distribution, such as a single-mode fiber or a multi-mode fiber can be used.

In FIG. 5, the coating 124 has a first coating layer 122 which is disposed in the innermost layer to be contacted with the glass fiber 121, and which has an outer diameter d2, and a second coating layer 123 which is an external coating covering the outer side of the first coating layer 122. The coating is not restricted to this configuration, and may have a configuration consisting of one layer or two or more layers. A colored layer may be disposed in the outermost layer.

A resin which constitutes the coating 124 is an ultraviolet curable resin such as urethane acrylate, and physical properties such as the elastic modulus are adequately set by additives. For example, the first coating layer 122 which is contacted with the glass fiber 121 has an elastic modulus which is lower (i.e., softer) than that of the second coating layer 123.

For example, the glass fiber insertion hole 142 may be a round hole, a rectangular hole, a regular polygon hole, or the like, or a V groove-like space. Here, the description will be made with setting the case of a round hole as a preferred example. In the case of a round hole, a force is easily applied uniformly in the circumferential direction of the optical fiber 120, and the property of removing the coating is excellent. The inner diameter D1 of the glass fiber insertion hole 142 is larger than the outer diameter d3 of the glass fiber 121, and smaller than the outer diameter (i.e., the outer diameter of the optical fiber 120) d1 of the coating 124. When the end face 120a of the optical fiber 120 is pressed against the circumference of the glass fiber insertion hole 142 of the ferrule 140, therefore, a tip end portion 142b of the insertion port 142a of the glass fiber insertion hole 142 butts against the end face 124a of the coating 124, and does not butt against the glass fiber 121.

Preferably, the inner diameter of the tip end portion 142b of the glass fiber insertion hole 142 is smaller than the outer diameter d2 of the first coating layer 122 which constitutes the coating 124, and larger than the outer diameter d3 of the glass fiber 121. When the end face 120a of the optical fiber 120 is pressed against the circumference of the glass fiber insertion hole 142, therefore, the tip end portion 142b butts against the first coating layer 122, and a force of peeling the first coating layer 122 from the glass fiber 121 can be directly applied to the first coating layer, whereby the removing property is improved. When the end face of the optical fiber 120 is pressed against the circumference of the insertion port 142a of the ferrule 140, the circumference butts against the end face 124a of the coating 124, and does not butt against the glass fiber 121, so that only the glass fiber 121 is inserted into the glass fiber insertion hole 142. The removal of the coating requires a force of about 150 to 200 gf.

According to the configuration, when the glass fiber 121 is inserted into the ferrule 140, the coating 124 can be simultaneously removed away, and therefore the work in the site is simplified. The rear end face 140b of the ferrule 140 shown in FIG. 5 is inclined in order that the coating removal is facilitated and the peeled coating 124 is easily outward moved.

As shown in FIGS. 1 and 2, the fixing portion 130 is disposed in the rear end portion of the base member 160. The fixing portion 130 has the lid 131. The lid 131 is pressed by a fixing portion clamper 132 against the intermediate face 161 of the base member 160, thereby fixing the optical fiber 120. The V groove 165 is similarly disposed also in the position of the base member 160 corresponding to the fixing portion 130, and the optical fiber 120 is pressed by the lid 131 to be fixed to a predetermined position (pass line). The fixing portion 130 and the rear portion of the base member 160 are housed in a rear housing 115b.

As shown in FIGS. 1 and 2, the flexure space 116 which can house the optical fiber 120 in a flexed state is disposed between the fixing portion 130 and the coating-removing portion 110. Namely, the coated portion of the optical fiber 120 which is in the rear of the glass fiber 121 inserted into the ferrule 140 is housed in a state where the optical fiber is flexed in the flexure space 116, and the optical fiber 120 is fixed in the fixing portion 130, whereby an elastic urging force directed toward the connecting face of the short optical fiber 141 incorporated in the ferrule 140 is given to the tip end face of the glass fiber 121 inserted into the glass fiber insertion hole 142 of the ferrule 140. Therefore, the connection state of the short optical fiber 141 and the optical fiber 120 is stably maintained.

FIG. 6(A) is a perspective view of the lid member which forms the flexure space, and FIG. 6(B) is a sectional view at position B-B in FIG. 6(A).

The flexure space 116 can be formed by attaching the lid member 150 such as shown in FIG. 6(A) to the intermediate face 161 which is formed by cutting away the base member 160. The lid member 150 is a block member having a substantially rectangular parallelepiped as a whole, a recess 151 which is upward directed from a middle portion of the lower face is formed along the longitudinal direction of the base member 160, and the flexure space 116 is formed so that the inserted optical fiber 120 can be upward flexed. As shown in FIG. 6(B), the height of the recess 151 forming the flexure space 116 is low in the both front and rear end portions, and high in the middle portion. A projection 152 which is downward projected is disposed on an end portion of the lower face of the lid member 150. When the lid member 150 is attached to the intermediate face 161 of the base member 160, the projection is fitted into the recess 166 (see FIG. 2(A)) disposed in the intermediate face 161 to position and fix the lid member 150. The lid member 150 is clamped together with the base member 160 by a clamper 153, and made movable by inserting a wedge member 154 (see FIG. 7(D)) between the lid member 150 and the intermediate face 161.

As shown in FIG. 1, the guide capillary 117 which restricts a radial movement of the optical fiber 120 is disposed between the coating-removing portion 110 and the flexure space 116. In the guide capillary 117, a positioning hole 117a having an inner diameter which is slightly larger than the outer diameter of the optical fiber 120 having the coating 124 is disposed, so that the flexed optical fiber 120 can be positioned in the pass line, and the tip end of the optical fiber 120 can be correctly guided to the coating-removing portion 110. Preferably, the distance (i.e., the length of the space 163)

between the tip end face 117b of the guide capillary 117 and the rear end face 140b of the ferrule 140 functioning as the coating-removing portion 110 is short (for example, about 0.5 mm to 1.0 mm) so that the glass fiber 121 can be correctly guided to the glass fiber insertion hole 142 of the ferrule 140. However, the space 163 must be ensured to have the size which can house the removed coating 124.

Next, the procedure of attaching the optical connector 101 to the coated optical fiber 120 will be described.

FIGS. 7(A) to 7(D) are diagrams illustrating steps of connecting the optical fiber to the optical connector, FIG. 8(A) is a sectional view showing the lid member in the insertion of the optical fiber, and FIG. 8(B) is a sectional view showing the lid member in the formation of the flexure space.

Figure 7:
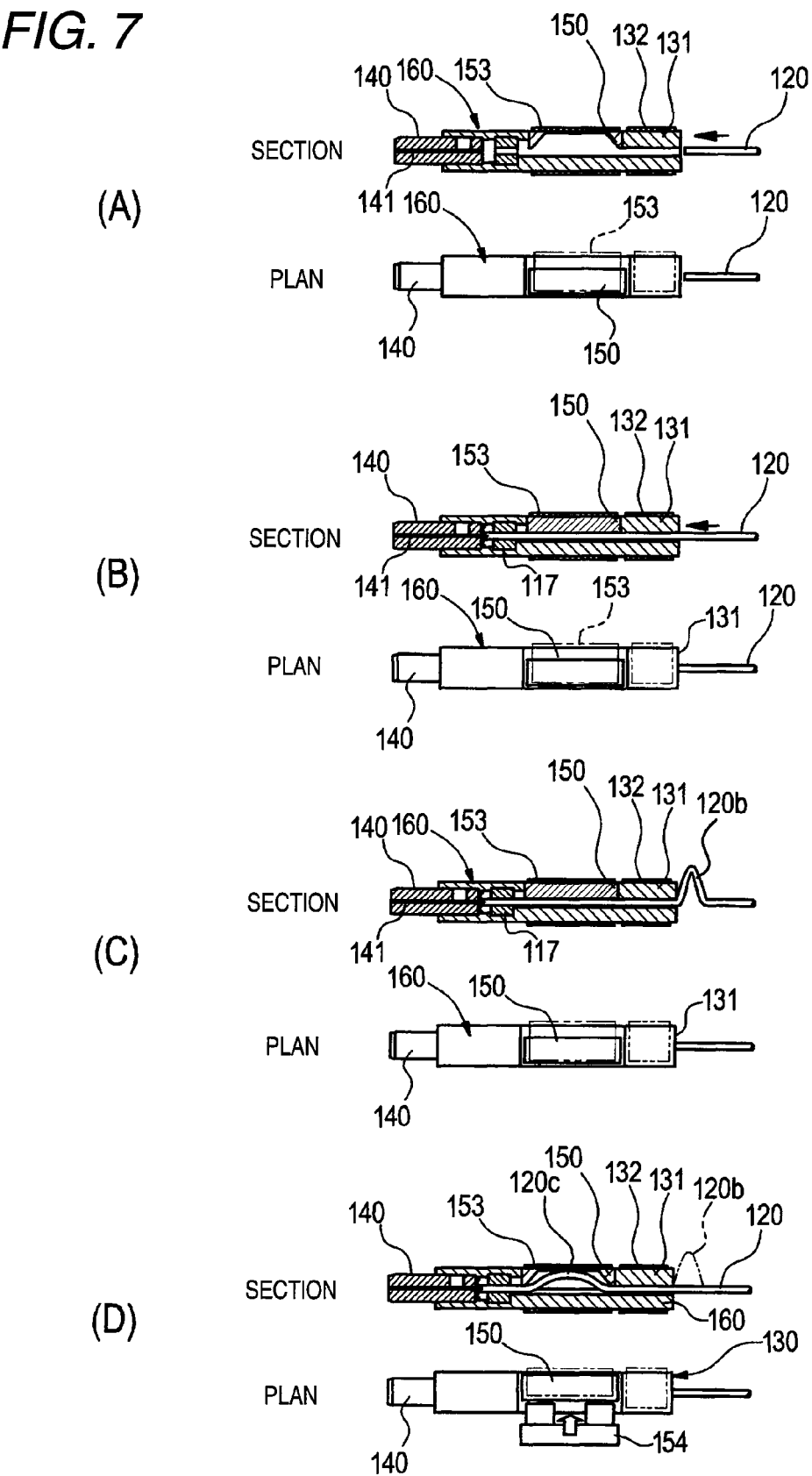
FIGS. 7(A) to 7(D) are diagrams illustrating steps of connecting an optical fiber to the optical connector shown in FIG. 1.

As shown in FIG. 7(A), first, the lid member 150 is clamped by the clamper 153, and a path for inserting the optical fiber 120 and consisting of the V groove 165 is formed between the lid member 150 and the intermediate face 161 of the base member 160. The path must be configured so that the optical fiber 120 can be pressed against the coating-removing portion 110 by a force of a predetermined level or higher without causing the optical fiber to flex. Therefore, as shown in FIG. 8(A), for example, the lid member 150 is not completely attached, and is obliquely attached and then clamped, whereby a path 155 of a size which allows the passing of the optical fiber 120 is formed between the V groove 165 and the bottom face 150a of the lid member 150. Also in the fixing portion 130, the lid 131 is clamped by the fixing portion clamper 132, and a path configured by the V groove 165 is formed. At this time, a half-clamped state is set so that the optical fiber 120 is not completely fixed by the lid 131. In this state, the coated optical fiber 120 is inserted from the rear side of the base member 160.

As shown in FIG. 7(B), then, the optical fiber 120 is inserted into the guide capillary 117 to perform radial positioning, and the tip end face of the optical fiber 120 is pressed against the coating-removing portion 110 of the rear end face 140b of the ferrule 140. When the straight optical fiber 120 buckles to flex, a force of about 100 gf is required. The force is smaller than the above-described force (150 to 200 gf) which is necessary for the coating removal in the coating-removing portion 110. In the coating removal, as described above with reference to FIG. 8(A), therefore, the lid member 150 is shifted so that the optical fiber 120 does not enter the recess 151 of the lid member 150, in order to prevent the optical fiber 120 from buckling. When the optical fiber 120 is pressed against the coating-removing portion 110, the coating 124 is peeled, and only the glass fiber 121 is inserted into the glass fiber insertion hole 142 of the ferrule 140, and the peeled coating 124 is housed in the space 163.

When the insertion of the optical fiber 120 is further continued, a preliminary flexure 120b is formed in the optical fiber 120 projected from the rear end face of the base member 160 as shown in FIG. 7(C). Preferably, the preliminary flexure 120b is formed in the length of, for example, about 1 to 7 mm.

The steps of FIGS. 7(A) to 7(c) can be performed by the series of operations of inserting the optical fiber 120.

As shown in FIG. 7(D), then, the wedge member 154 is inserted to make the lid member 150 movable. The lid member 150 is positioned so that, as shown in FIG. 8(B), the projection 152 of the lid member 150 is fitted into the recess 166 of the base member 160, and the recess 151 of the lid member 150 is located immediately above the V groove 165 of the base member 160, thereby forming the flexure space 116. The wedge member 154 is removed away. In this state, the preliminary flexure 120b of the optical fiber 120 which is formed in FIG. 7(C) is moved into the flexure space 116, and a flexure portion 120c is formed in the flexure space 116. Thereafter, the lid 131 of the fixing portion 130 is completely clamped by the fixing portion clamper 132, to fix the optical fiber 120.

When the lid member 150 and the lid 131 of the fixing portion 130 are integrated with each other, the optical fiber 120 can be fixed in the fixing portion 130 at the same time when the flexure portion 120c is formed in the flexure space 116.

When, without forming the preliminary flexure 120b, the recess 151 of the lid member 150 is moved to a position immediately above the V groove 165 of the base member 160 and the optical fiber 120 is then further pushed, the flexure portion 120c can be formed in the flexure space 116.

According to the above-described optical connector 101, when the optical connector 101 is to be attached to the optical fiber 120 having the coating 124 in the outer circumference of the glass fiber 121, the optical fiber 120 is inserted into the base member 160, and the end face of the optical fiber 120 is pressed against the optical fiber insertion port 142a of the ferrule 140, whereby the coating 124 can be easily removed by the insertion force of the optical fiber 120 and the glass fiber 121 can be inserted into the glass fiber insertion hole 142 of the ferrule 140. Therefore, the coated optical fiber 120 can be easily connected to the short optical fiber 141 incorporated in the ferrule 140, particularly without performing the coating removing work before the insertion into the optical connector 101. Furthermore, the coated optical fiber 120 can be positioned with reference to the outer circumferential face of the glass fiber 121. Therefore, accurate positioning can be easily performed.

Next, another mode example of the optical connector of the invention will be described.

(Second Embodiment)

Figure 9:
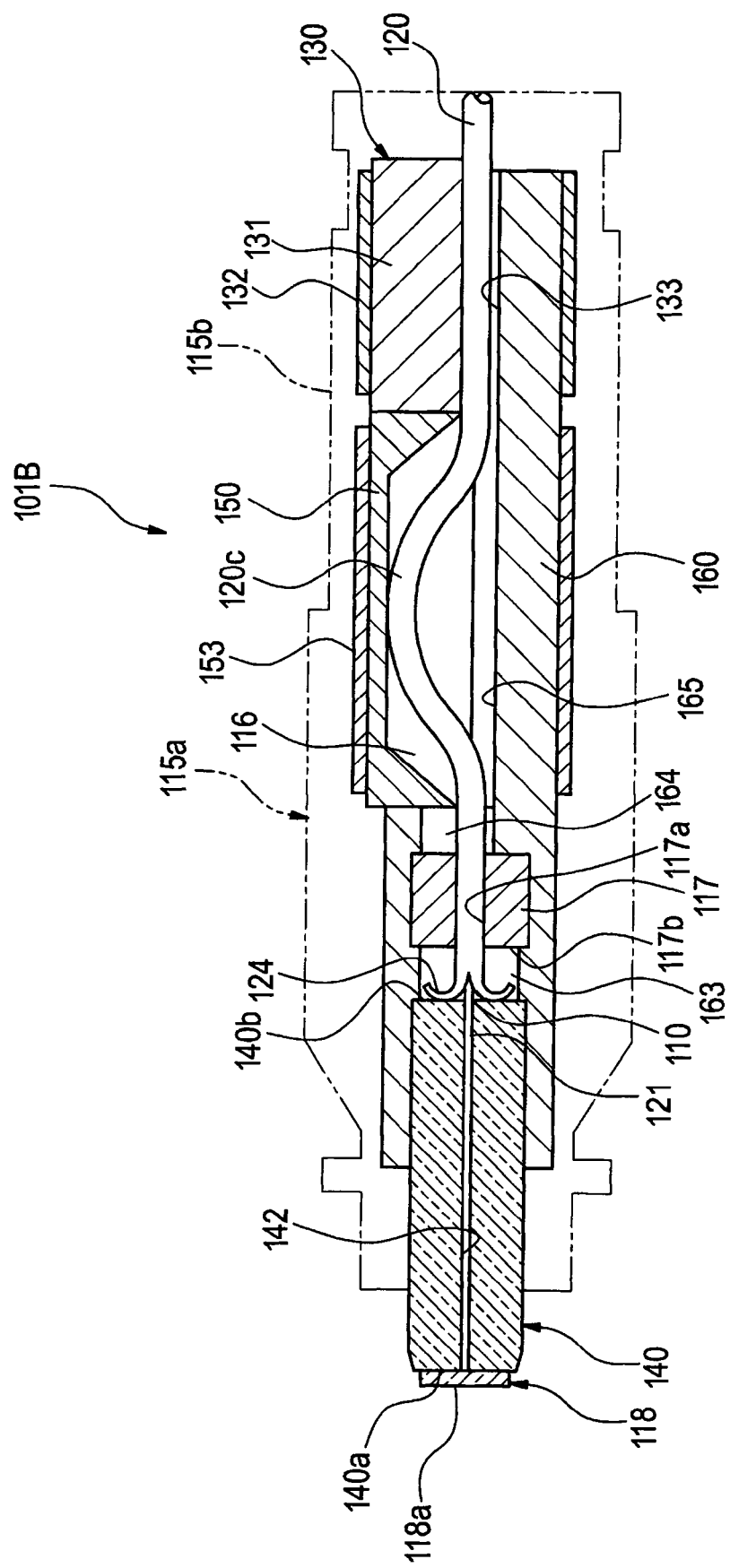
FIG. 9 is a sectional view showing another embodiment of the optical connector of the invention.

FIG. 9 is a sectional view of another embodiment of the optical connector. Components which are common to the optical connector of the above-described embodiment are denoted by the same reference numerals, and duplicated description will be omitted.

As shown in FIG. 9, in the optical connector 101B, a thin film 118 which is an optical component is disposed on the tip end face of the ferrule 140 so as to cover the end portion of the glass fiber insertion hole 142. The thin film 118 is a substantially sheet-like protection member through which light is transmitted with a refractive index that is equivalent to that of the core of the optical fiber 120, and bonded so as to cover the glass fiber insertion hole 142. The thin film 118 has a sheet-like shape having a thickness of, for example, 5 to 30 μm, and an outer side face 118a is not adhesive so that dust and the like hardly adhere.

Therefore, it is not necessary to previously dispose the glass fiber (shot optical fiber 141) in the glass fiber insertion hole 142 of the ferrule 140, and the cutaway 143 is not required to be disposed in the ferrule 140.

Also this configuration can achieve similar effects as the optical connector 101 of the above-described embodiment.

(Third Embodiment)

The optical connectors of the above-described embodiments include the short optical fiber 141 or thin film 118 which is an optical component. Alternatively, a configuration where an optical component is not disposed may be possible.

Figure 10:
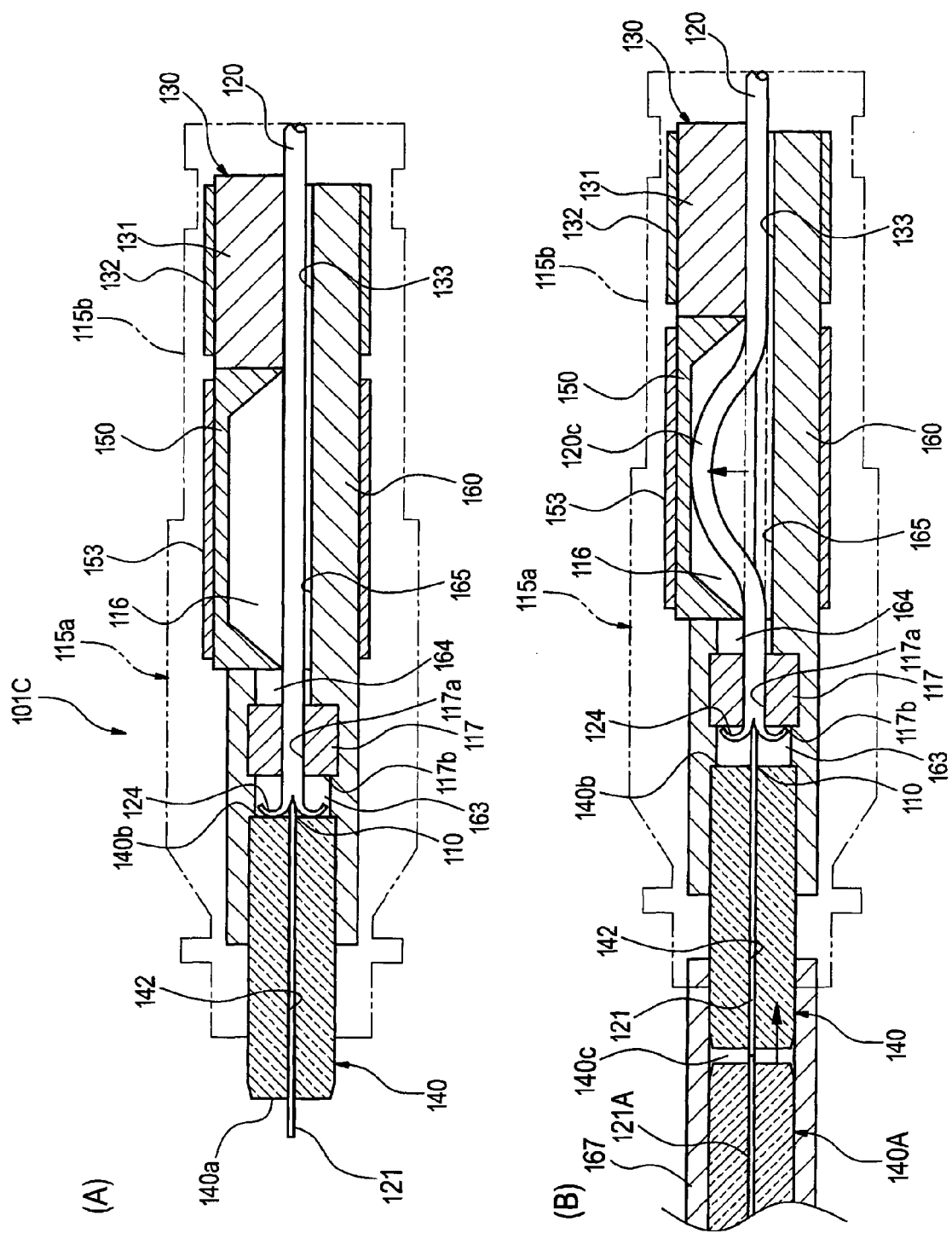
FIG. 10 is a sectional view showing a further embodiment of the optical connector of the invention.

In an optical connector 101C shown in FIG. 10, for example, the glass fiber 121 in which the end face of the optical fiber 120 is pressed against the optical fiber insertion port 142a of the ferrule 140 and the coating 124 is removed is previously inserted into the glass fiber insertion hole 142 until it is projected from the tip end face 120a of the ferrule 140

(see FIG. 10(A)). As shown in FIG. 10(B), then, a counter ferrule 140A in which a glass fiber 121A is similarly projected is butted while being aligned by a guiding member 167. In the butted portion 140c between the ferrules 140, 140A, therefore, the tip ends of the glass fibers 121, 121A are butted against each other, and the glass fiber 121 is pushed back in the glass fiber insertion hole 142, so that, correspondingly with the length, the flexure portion 120c is formed in the flexure space 116. When the optical fiber 120 is then fixed by the fixing portion 130, an elastic urging force directed toward the counter optical fiber 121A is given to the tip end face of the glass fiber 121, whereby the connection state is stably maintained.

Therefore, it is not necessary to previously dispose the glass fiber (shot optical fiber 141) in the glass fiber insertion hole 142 of the ferrule 140, and the cutaway 143 is not required to be disposed in the ferrule 140. The above-described refractive index matching material 144 or thin film 118 may be interposed in the butted portion 140c between the ferrules 140, 140A. The refractive index matching material 144 or the thin film 118 may be disposed in one of the ferrules 140, 140A, or alternatively may be inserted during the connection.

Also this configuration can achieve similar effects as the optical connector 101 of the above-described embodiment.
(Fourth Embodiment)

The invention is not restricted to the form of an optical connector, and may employ the form of, for example, a mechanical splice.

Figure 11:
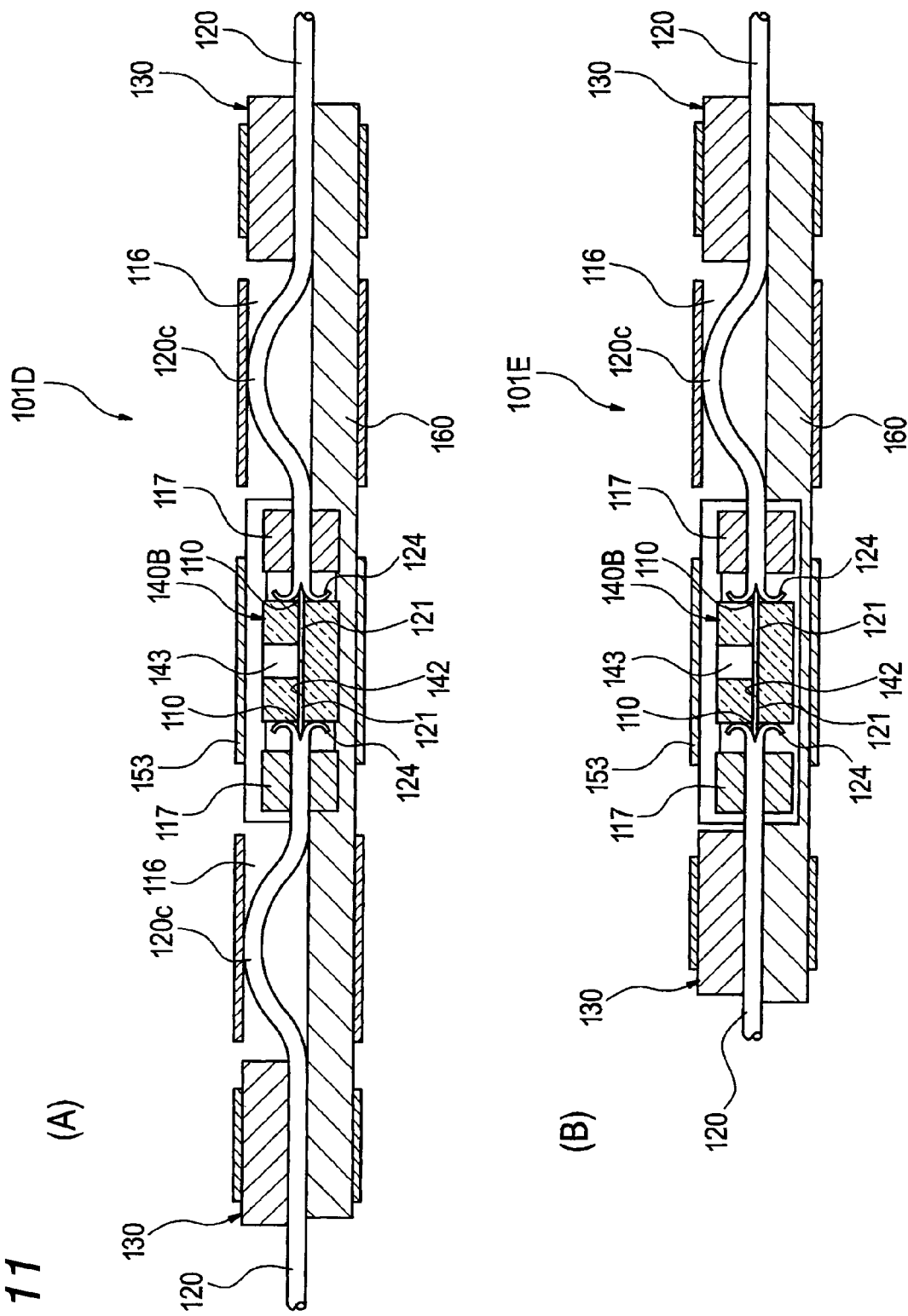
FIG. 11 is a sectional view showing an example of an embodiment of a mechanical splice which is the optical connection member of the invention.

As shown in FIG. 11(A), a mechanical splice 101D which is an optical connection member is a mechanical splice which can be attached to a coated optical fiber in the working site, and in which the coated optical fibers 120 are to be inserted from the both sides, and the glass fibers 121 are to be inserted respectively from the both sides into the glass fiber insertion hole 142 of a connecting capillary 140B that is a middle connecting portion, to be butt connected with each other. The both ends of the connecting capillary 140B are configured in the same manner as the rear end face 140b of the above-described ferrule 140, and the insertion ports of the glass fiber insertion hole 142 function as the coating-removing portion 110 which removes the coating 124 from an end portion of the optical fiber 120. On the both right and left sides of the middle connecting capillary 140B, the guide capillary 117, the flexure space 116, and the fixing portion 130 are disposed in a bilaterally symmetrical manner.

In the thus configured mechanical splice 101D, the optical fibers 120 are inserted from the right and left sides, respectively, the optical fibers 120 are inserted into the guide capillaries 117 to perform radial positioning, and the tip end faces of the optical fibers 120 are pressed against the coating-removing portions 110 of the connecting capillary 140B. Therefore, the coatings 124 can be easily removed and the glass fibers 121 can be inserted into the glass fiber insertion hole 142 of the connecting capillary 140B. Consequently, the coated optical fibers 120 can be easily connected to each other in the glass fiber insertion hole 142 of the connecting capillary 140B, without performing the coating removing work before the insertion into the mechanical splice 101D. Moreover, each of the optical fibers 120 can be fixed by the fixing portion 130 in the state where the flexure portion 120c is formed in the flexure space 116. Therefore, an elastic urging force in the direction along which the tip end faces of the glass fibers 121 are butted against each other is given to the glass fibers, whereby the connection state is stably maintained.

As in a mechanical splice 101E which is an optical connection member shown in FIG. 11(B), the flexure space 116 may be disposed only in one side.

In the connecting capillaries 140B of the mechanical splices 101D, 101E, similarly with the ferrule 140, the cutaway 143 is disposed in the middle portion, and the glass fiber insertion hole 142 is exposed. Therefore, the above-described refractive index matching material 144 or thin film 118 can be easily inserted in the connecting face between the glass fibers 121. When the glass fibers 121 are to be introduced into the glass fiber insertion hole 142 and butted against each other, the air can escape through the cutaway 143, so that the connection can be smoothly performed.

In the case where the thin film 118 is introduced in the cutaway 143, the thin film 118 exerts a resistance of the connection between the glass fibers 121. Therefore, a mode of the mechanical splice 101D in which the elastic urging force in the butting direction is applied from the both sides is preferable.

The optical connector and optical connection member of the invention are not restricted to the above-described embodiments, and adequate modifications, improvements, and the like are possible.

For example, the inner side of the insertion port 142a (see FIG. 5) of the glass fiber insertion hole 142 is preferably chamfered. As shown in FIG. 12(A), for example, chamfering (R chamfer 145a) may be performed by an arcuate curved face. Alternatively, as shown in FIG. 12(B), chamfering (C chamfer 145b) may be performed by a linear plane. According to the configuration, the optical fiber 120 is easily inserted into the glass fiber insertion hole 142.

In the same manner as the inner diameter of the insertion port 142a, preferably, the inner diameter D2 of the large-diameter end 144 of the chamfer 145a or 145b which is the tip end of the glass fiber insertion hole 142 is smaller than the outer diameter d2 of the first coating layer 122 which constitutes the coating 124, and larger than the outer diameter d3 of the glass fiber 121.

As shown in FIGS. 13(A) and 13(B), initial flaws 125 are previously formed in an outer circumferential portion of the tip end of the coating 124. Preferably, the initial flaws 125 are disposed in the outer circumferential face of the coating 124, in a plural number (in FIG. 13(A), four) at regular intervals, and in a predetermined length which is shorter in the axial direction than the coating removal length. For example, the initial flaws 125 may have a V-like sectional shape. Alternatively, notches may be simply disposed. According to the configuration, the coating 124 is easily peeled toward the outside, and hence the coating 124 can be easily removed.

As shown in FIG. 14(A), an initial flaw 126 may be continuously disposed along the circumferential direction of the optical fiber 120, at a position which is separated from the tip end face 120a of the optical fiber 120 by a constant distance, for example, the coating removal length (for example, about 0.5 to 1 mm). In this case, preferably, the initial flaw 126 may be a notch which is inward cut toward the end portion of the optical fiber 120. According to the configuration, when the optical fiber 120 is pressed against the glass fiber insertion hole 142, as shown in FIG. 14(B), a coating 124b in the end portion is pushed in the rightward direction in the figure to be outward expanded along the initial flaw 126. Therefore, the coating 124b can be easily removed. When the position of the initial flaw 126 is set to be separated from the tip end face 120a by the coating removal length, it is possible to remove a predetermined length of the coating 124.

Figure 15:
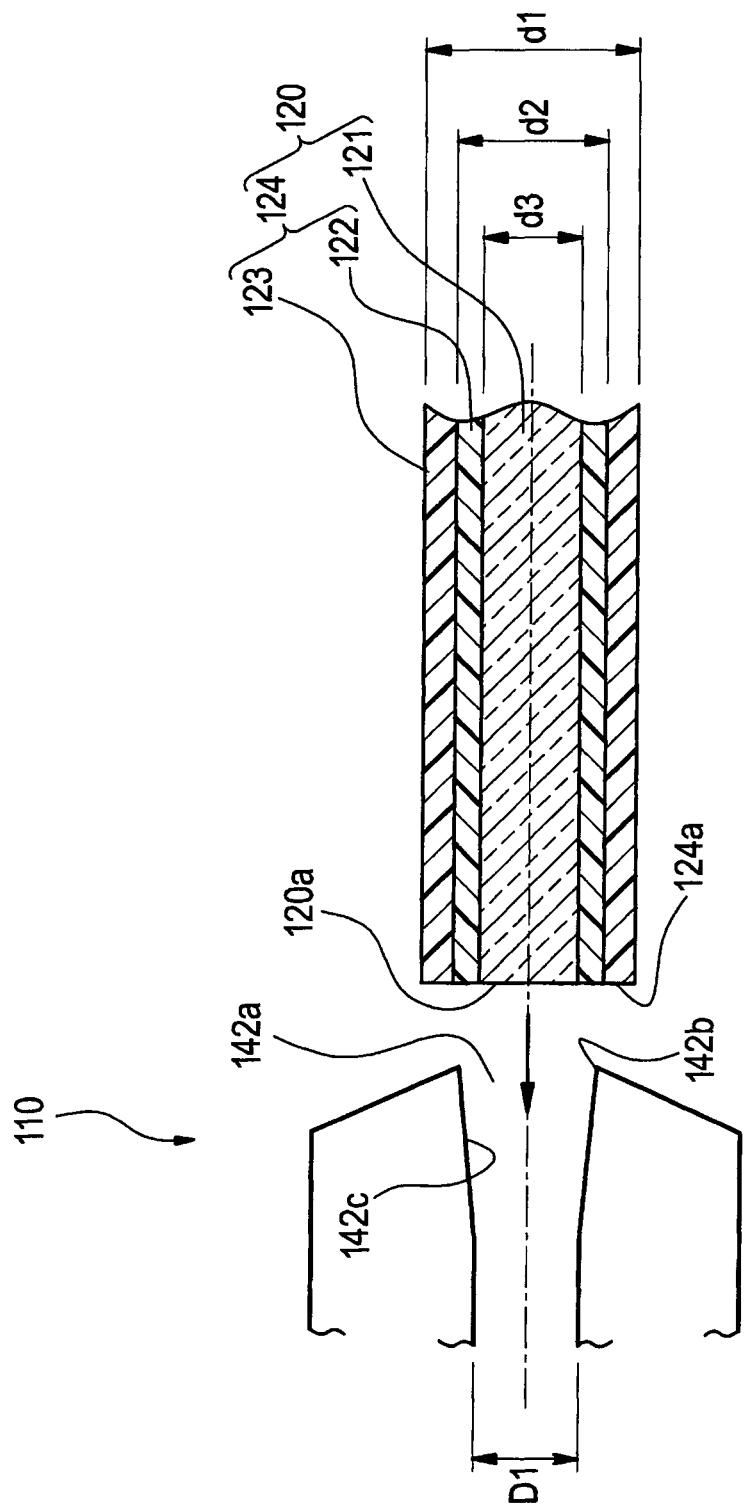
FIG. 15 is a sectional view showing another example of the shape of the insertion hole.

FIG. 15 shows another example of the sectional shape of the insertion port 142a of the glass fiber insertion hole 142.

In the insertion port 142*a*, a tapered portion 142*c* in which the inner diameter is gradually reduced from the tip end face of the insertion port 142*a* toward the inside is disposed. The inner diameter of the tip end portion 142*b* of the tapered portion 142*c* is smaller than the outer diameter d1 of the optical fiber 120, and larger than the outer diameter d3 of the glass fiber 121 of the optical fiber 120. Preferably, the inner diameter of the tip end portion 142*b* is smaller than d2 so that the tip end portion 142*b* butts against first coating layer 122. Preferably, the taper angle of the tapered portion 142*c* is from 30° to 90°.

When the optical fiber 120 is pressed against the insertion port 142*a* having the configuration of FIG. 15, the end face 124*a* of the coating 124 butts against the tip end portion 142*b*, the coating 124 is peeled from the glass fiber 121, and the tip end of the glass fiber 121 is pressed into the glass fiber insertion hole 142. Then, the optical fiber 120 is inserted along the tapered portion 142*c*. Therefore, the tip end portion of the optical fiber 120 can be accurately positioned.

(Fifth Embodiment)

Figure 16:
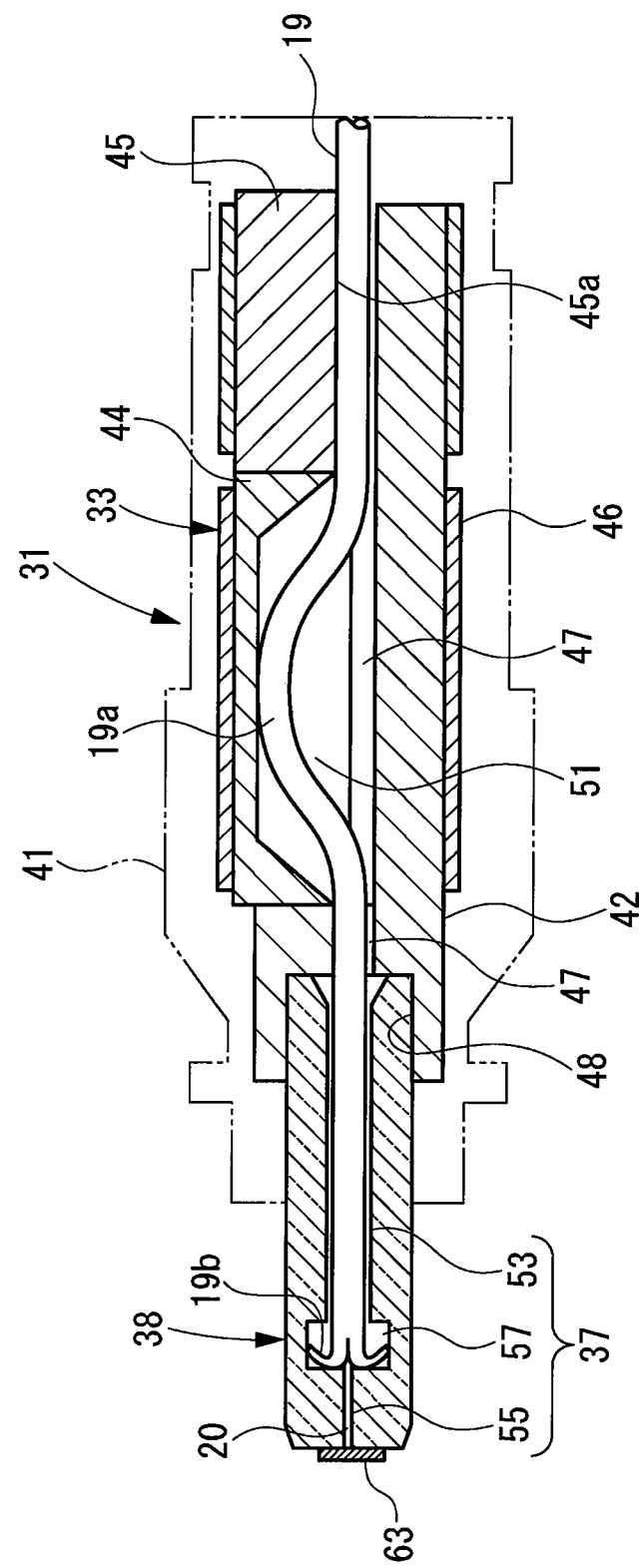
FIG. 16 is a longitudinal sectional view of a fifth embodiment of the optical connector of the invention.
Figure 17:
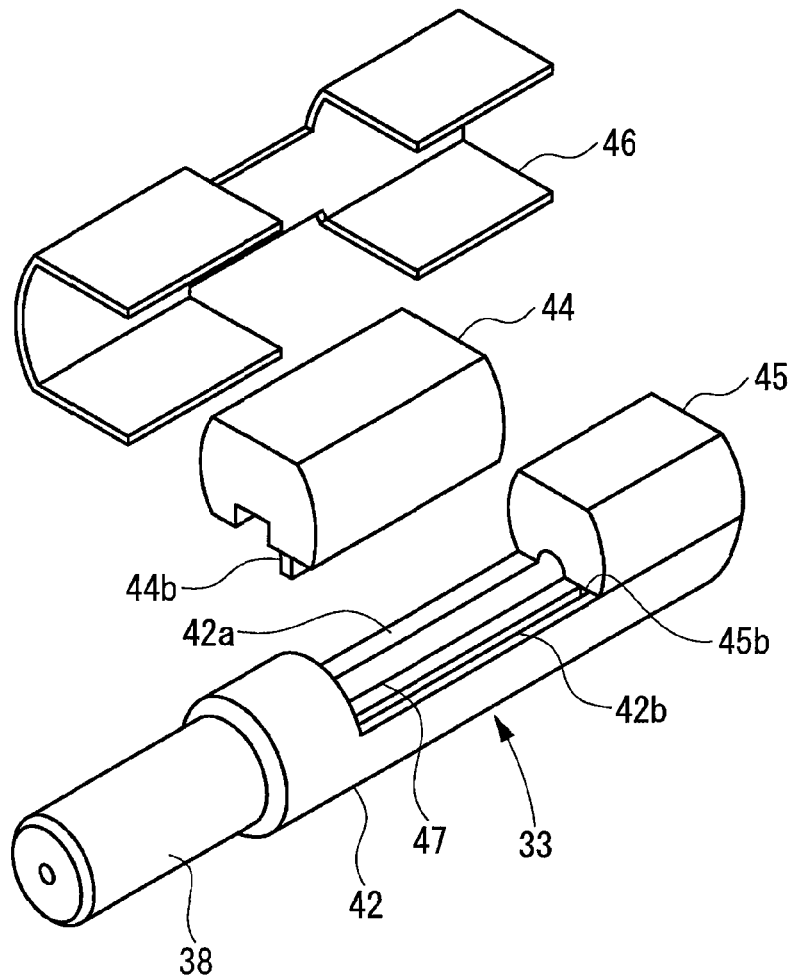
FIG. 17 is an exploded perspective view of a body portion of the optical connector shown in FIG. 16.
Figure 18:
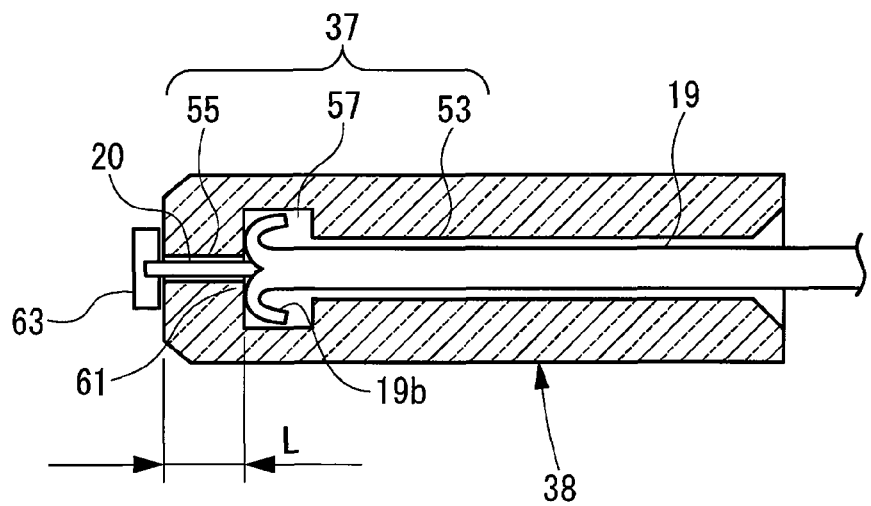
FIG. 18 is an enlarged view of a ferrule shown in FIG. 16.
Figure 19:
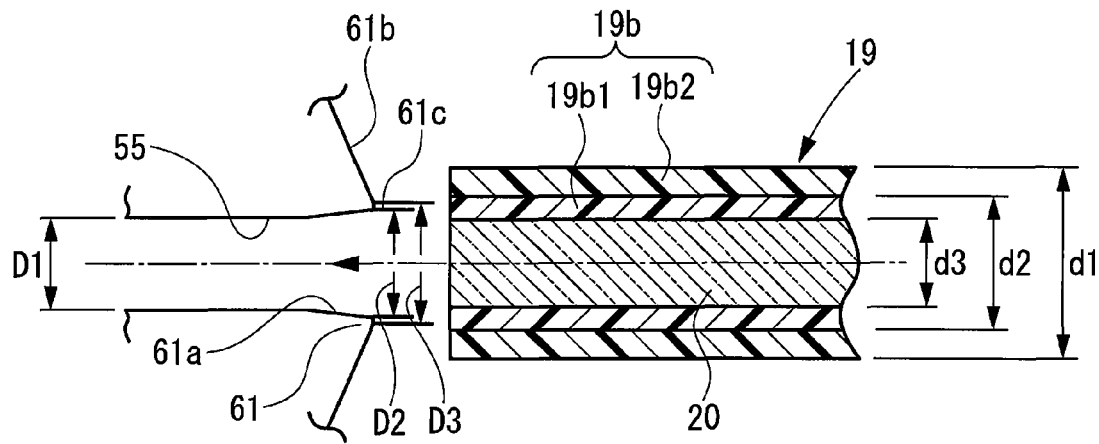
FIG. 19 is an enlarged view showing the configuration of a coating-removing portion of the ferrule shown in FIG. 18.
Figure 20:
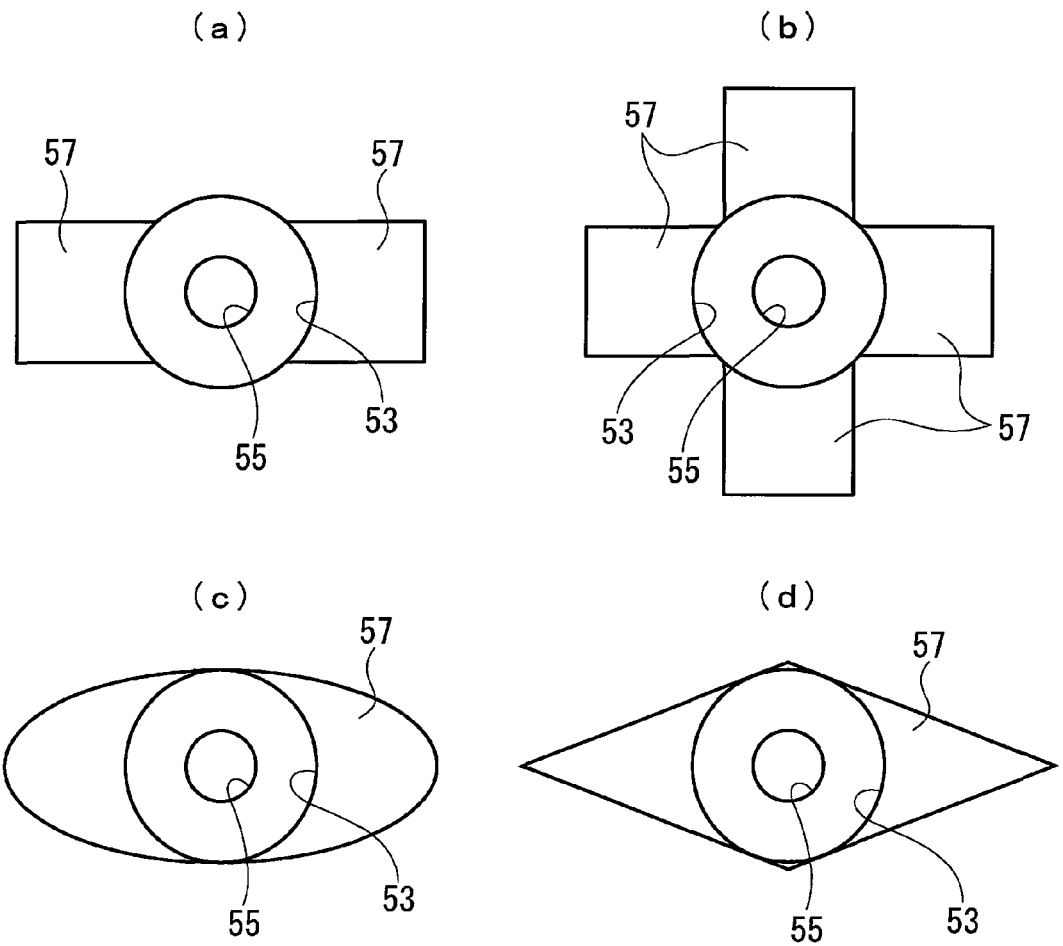
FIG. 20 is a diagram of the space of a coating-receiving portion of the ferrule shown in FIG. 18.
Figure 21:
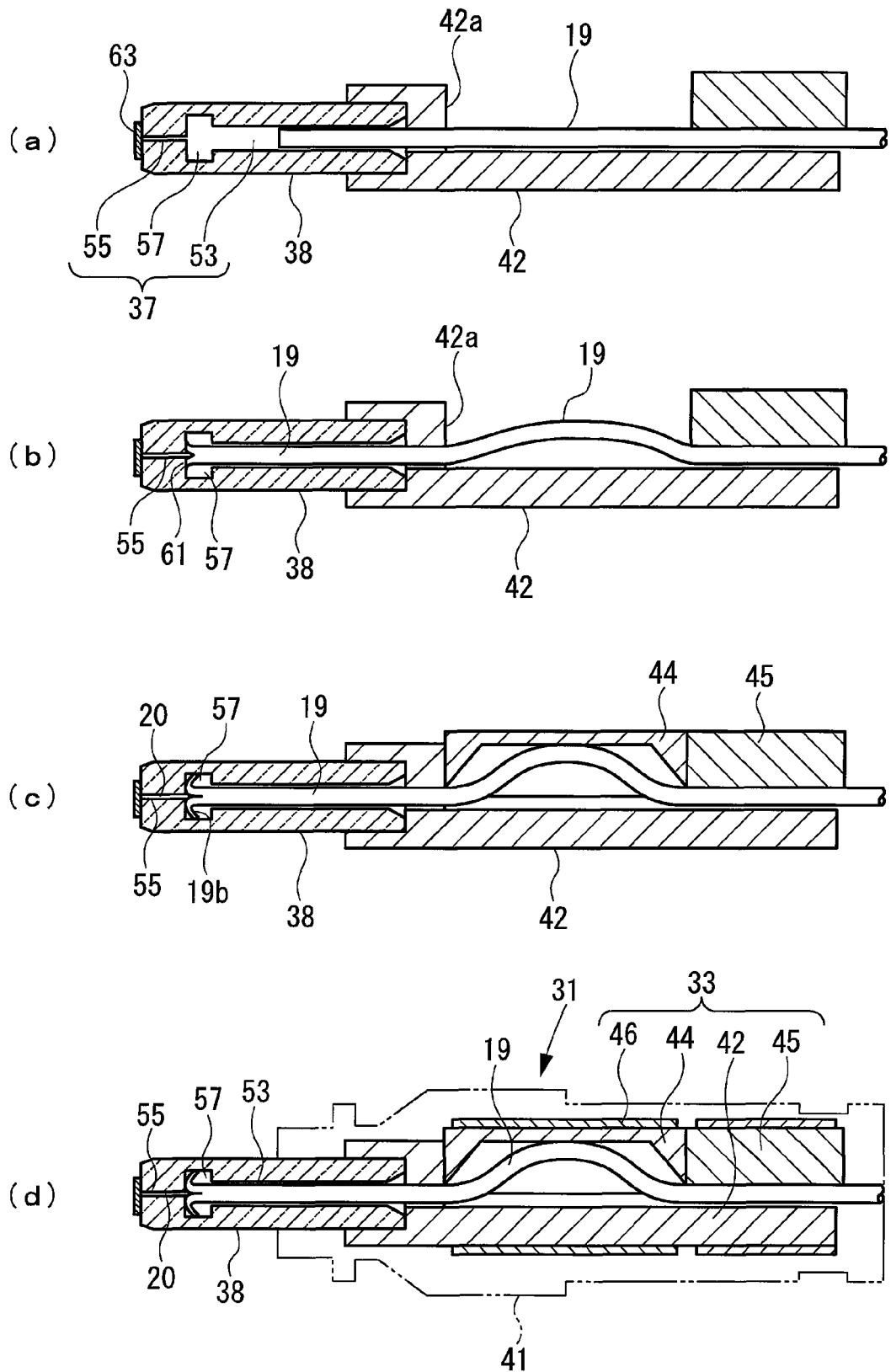
FIG. 21 is a diagram of a method of attaching the optical connector shown in FIG. 16 to a coated optical fiber.

FIG. 16 is a longitudinal sectional view showing an optical connector of a fifth embodiment of the invention, FIG. 17 is an exploded perspective view of a body portion of the optical connector shown in FIG. 16, FIG. 18 is an enlarged view of a ferrule shown in FIG. 16, FIG. 19 is an enlarged view showing the configuration of a coating-removing portion of the ferrule shown in FIG. 18, FIG. 20 is a diagram of the space of a coating-receiving portion of the ferrule shown in FIG. 18, and FIG. 21 is a diagram of a method of attaching the optical connector shown in FIG. 16 to a coated optical fiber.

The optical connector 31 of the fifth embodiment is an optical connector which is to be attached to a coated optical fiber 19, and configured by: a body portion 33 in which the coated optical fiber 19 is to be passed and fixed; a ferrule 38 which is fitted to the body portion 33, and with which an optical fiber holding hole 37 that is coaxial with the body portion 33 communicates; and a housing 41 which covers the body portion 33 and a part of the ferrule 38 projected from the body portion 33.

As shown in FIG. 17, the body portion 33 is configured by: a base member 42 in which the ferrule 38 is fitted and attached to the tip end; an extra-length housing lid member 44 and fixing lid member 45 which are stacked on a notch portion 42*a* in rear of the base member 42; and a clamp member 46 which clamps and fixes the lid members 44, 45 stacked on the base member 42, integrally with the base member 42.

In the base member 42, a fiber passing portion 47 through which the coated optical fiber 19 is to be passed is passingly formed, and a ferrule fitting hole 48 (see FIG. 16) into which a basal end portion of the ferrule 38 is fitted is formed in the tip end side.

The rear half of the base member 42 has a half-split structure in which the upper side of the fiber passing portion 47 is exposed by the notch portion 42*a*.

The extra-length housing lid member 44 which is put on a substantially front half of the notch portion 42*a* has a structure in which a middle portion of the inner face side is hollowed as shown in FIG. 16, and an extra-length housing space 51 which houses an extra length (flexed portion) 19*a* of the coated optical fiber 19 is defined above the fiber passing portion 4.

The fixing lid member 45 fixes the coated optical fiber 19 in a state where the outer circumferential face of the coated optical fiber 19 placed in the fiber passing portion 47 having a V-groove structure is pressed against the V groove and positioned by the inner face 45*a* of the lid member.

In the lid members 44, 45, positioning ridges 44*b*, 45*b* which are projected from the respective lower faces are fitted into a guide groove 42*b* that is formed in the butting face of the notch portion 42*a*, whereby positional displacement in the width direction (in FIG. 16, the direction perpendicular to the plane of the figure) in the butting is prevented from occurring.

The clamp member 46 is formed by, for example, press molding of a spring metal sheet, and clamps the upper faces of the lid members 44, 45 and the lower face of the base member 42, whereby the lid members 44, 45 are fixed to the base member 42.

As shown in FIGS. 16 and 18, the optical fiber holding hole 37 of the ferrule 38 includes: a first hole portion 53 having an inner diameter which is substantially equal (correctly, slightly larger than) to the outer diameter (the outer diameter d1 in FIG. 19) of the coated optical fiber 19; a second hole portion 55 having an inner diameter which is substantially equal (correctly, slightly larger than) to the outer diameter (the outer diameter d3 in FIG. 19) of the bare optical fiber 20 in which the coating of the coated optical fiber 19 is peeled; and a coating-receiving portion 57 which is a space that is located between the first hole portion 53 and the second hole portion 55, and that is to house the coating 19*b* peeled in the tip end portion of the coated optical fiber 19.

As illustrated, the coating-receiving portion 57 is formed as a space which is larger than the first hole portion 53.

For example, the coating-receiving portion 57 is formed into a space having a rectangular sectional shape such as shown in FIG. 20(*a*), or a cross sectional shape such as shown in FIG. 20(*b*). Alternatively, the space may have an elliptical sectional shape such as shown in FIG. 20(*c*), or a rhombic sectional shape such as shown in FIG. 20(*d*).

As shown in FIGS. 18 and 19, an end portion of the second hole portion 55 that faces the coating-receiving portion 57 forms a coating-removing portion 61 against which the coating 19*b* (configured by a first coating 19*b*1 and a second coating 19*b*2) of the coated optical fiber 19 inserted from the side of the first hole portion 53 butts, and which peels the coating 19*b*.

As enlargedly shown in FIG. 19, the tip end of the coating-removing portion 61 is formed into an acute-angled shape by a tapered portion 61*a* which is formed on the inner circumferential face of an end portion of the second hole portion 55, and a tapered portion 61*b* which is formed on the wall face on the side of the coating-receiving portion 57 continuous with the end portion of the second hole portion 55. In the embodiment, the tip end of the coating-removing portion 61 is formed into a conical shape.

The shape of the coating-removing portion 61 will be described in detail. The portion has the following shape.

The end portion of the second hole portion 55 having the inner diameter D1 which is substantially equal (slightly larger than) to the outer diameter of the bare optical fiber 20 is set by the tapered portion 61*a* to have a dimension D2 that is larger than the inner diameter d3 of the first coating 19*b*1 of the coated optical fiber 19, and that is smaller than the outer diameter d2 of the first coating 19*b*1.

By contrast, the tapered portion 61*b* which is formed on the wall face on the side of the coating-receiving portion 57 continuous with the end portion of the second hole portion 55 is formed as a tapered face which is gradually inclined from a position having a dimension D3 that is larger than D2, and that is smaller than the outer diameter d2 of the first coating 19*b*1.

Therefore, the tip end portion of the coating-removing portion 61 has a shape in which, although the small width interposed between D2 and D3, a flat face 61c that receives collision with the coated optical fiber 19 remains.

In the case where the above-described configuration is employed, when the flat face 61c of the coating-removing portion 61 butts against the coating position of the coated optical fiber 19 which is passed through the first hole portion 53, the flat face butts against the position of the first coating 19b1 on the inner circumference side which is lower in hardness than the second coating 19b2 on the outer circumference side. Therefore, the coating removal can be easily performed.

Since the inner circumferential face of the end portion of the second hole portion 55 is set as the tapered portion 61a, the bare optical fiber 20 from which the coating is removed can be well guided into the second hole portion 55.

In the embodiment, the length L of the second hole portion 55 shown in FIG. 18 is set to about 5 mm or less.

When the length of the second hole portion 55 is set to about 5 mm or less, the peeling of the coating 19b is enabled to be performed more than the length of the second hole portion 55, and the exposed bare optical fiber 20 can be passed to the tip end of the second hole portion 55.

As shown in FIG. 18, in order to prevent the transmission characteristics in joining with a counter connector or the like from being lowered, a refractive index matching film 63 is bonded to the tip end face of the ferrule 38 from which the end face of the bare optical fiber 20 is exposed.

Next, a method of attaching the above-described optical connector 31 to the coated optical fiber 19 will be described with reference to FIG. 21.

In the attaching method, steps of; as shown in FIG. 21(a), inserting the coated optical fiber 19 into the first hole portion 53 of the optical fiber holding hole 37 of the ferrule 38 which is fitted and attached to the tip end of the base member 42; as shown in FIG. 21(b), butting the tip end of the coated optical fiber 19 against the coating-removing portion 61 of the rear end of the second hole portion 55 to peel the coating 19b of the tip end side, and housing the peeled coating 19b into the coating-receiving portion 57; and, as shown in FIG. 21(c), inserting the bare optical fiber 20 which is exposed by peeling the coating 19b, into the second hole portion 55 are sequentially performed.

When the insertion of the exposed bare optical fiber 20 into the second hole portion 55 is completed, the lid members 44, 45 are put on the notch portion 42a of the base member 42 as shown in FIG. 21(c). As shown in FIG. 21(d), the lid members 44, 45 are fixed to the base member 42 by the clamp member 46, and the housing 41 then is attached to the outer circumference thereof, thereby completing the method of attaching the optical connector 31 to the coated optical fiber 19.

In the above-described optical connector 31 and method of attaching the optical connector 31 to the coated optical fiber 19, the coating-receiving portion 57 which houses the coating 19b peeled from the tip end portion of the coated optical fiber 19 is disposed in the ferrule 38. When the coated optical fiber 19 is to be inserted into the optical fiber holding hole 37, therefore, the work of previously removing the peeled coating 19b is not necessary.

Moreover, the coating-removing portion 61 which, when the coating 19b of the tip end portion of the coated optical fiber 19 butts, peels the coating 19b is disposed in the ferrule 38. Therefore, also the work of, before the insertion into the ferrule 38, peeling the coating 19b of the coated optical fiber 19 is not necessary.

Namely, the work of removing the coating on the tip end side of the coated optical fiber 19 can be omitted, and the work of attaching the coated optical fiber 19 to the optical connector 31 in the site can be simplified, and made more efficient.

In the optical connector 31 of the embodiment, the tip end of the coating-removing portion 61 disposed in the ferrule 38 is formed into an acute-angled shape as shown also in FIG. 19.

When the coating 19b of the tip end of the coated optical fiber 19 butts against the coating-removing portion 61, therefore, the coating 19b is easily peeled. Even when the operating force of inserting the coated optical fiber 19 into the ferrule 38 is small, the coating 19b can be surely peeled.

In the case where the tip end of the coating-removing portion 61 is formed into a conical or pyramidal shape as in the above-described embodiment, when the coating 19b of the coated optical fiber 19 butts against the coating-removing portion 61, the coating is scattered in the circumferential direction to be finely broken into plural pieces, and the scattered coatings are easily housed in the coating-receiving portion 57. This is preferable.

In the optical connector 31 of the embodiment, the coating-receiving portion 57 is formed into a space having a rectangular sectional, a cross sectional shape, an elliptical sectional shape, or a rhombic sectional shape as shown in FIG. 20.

Therefore, the coating-receiving portion 57 extends to the both sides of the first hole portion 53 in the body of the ferrule 38, or in four directions, the space for housing the peeled coating 19b can be ensured, and the coating 19b peeled by the coating-removing portion 61 can be efficiently housed. The shape of the coating-receiving portion 57 is not restricted to the above-mentioned shapes, and various shapes may be selected.

(Sixth Embodiment)

Figure 22:
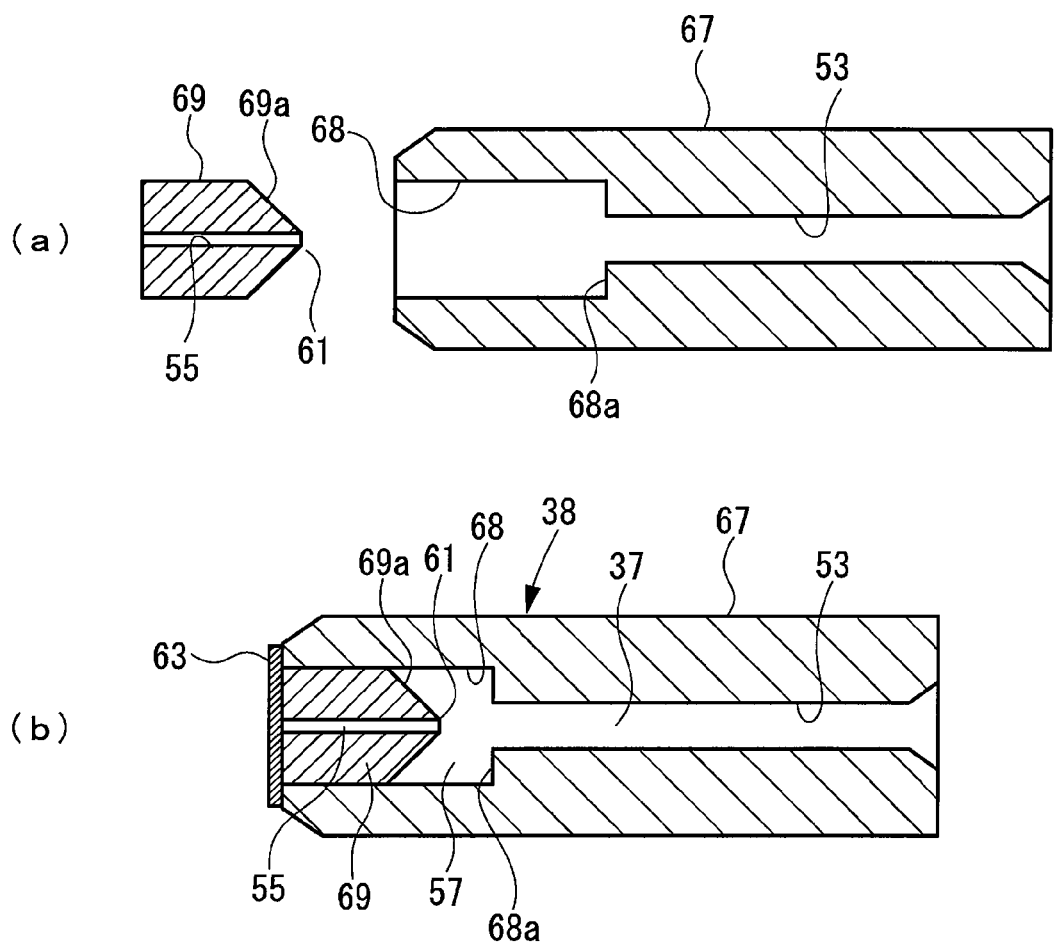
FIG. 22 is a diagram of another embodiment of a ferrule used in the optical connector of the invention.

FIG. 22 is a diagram of another embodiment of a ferrule used in the optical connector of the invention.

In the optical fiber holding hole 37 disposed in the ferrule 38 shown in the figure, the first hole portion 53 and the second hole portion 55 are formed in separate components, respectively.

This will be described in more detail. As shown in FIG. 22(a), the ferrule 38 is configured by two components, or a ferrule body 67 having the first hole portion 53, and a coating-removing component 69 which is to be fitted into a fitting hole 68 formed in the tip end of the ferrule body 67. The second hole portion 55 is passingly formed in the coating-removing component 69.

In the coating-removing component 69, the opening end of the second hole portion 55 is formed as the acute-angled coating-removing portion 61. When the coating-removing component 69 is fitted and attached into the fitting hole 68 of the ferrule body 67, as shown in FIG. 22(b), the coating-receiving portion 57 for housing the coating 19b peeled by the coating-removing portion 61 is defined between the tip end face 69a which provides the coating-removing portion 61 of the coating-removing component 69, and the bottom face 68a of the fitting hole 68.

As shown in FIG. 22(b), when the two components are fitted and integrated with each other, namely, the ferrule body 67 functions as the ferrule 38 having the optical fiber holding hole 37 configured by the first hole portion 53, the second hole portion 55, and the coating-receiving portion 57.

In the case where the first hole portion 53 and the second hole portion 55 are formed respectively in separate components as described above, when two components having a simple cylindrical structure are combined with each other in the ferrule 38, it is possible to easily obtain a structure in which the first hole portion 53 and second hole portion 55 that have different diameters are coaxially arranged. The productivity can be improved as compared with the case where first and second hole portions having different diameters are formed in a single component.

In the component 69 having the second hole portion 55 in which a higher alignment accuracy is required, an outer circumferential process which uses the hole center of the second hole portion 55 as the rotation axis can improve the accuracy. By a measure such as that a material which is more suitable to an accurate process than the component (ferrule body 67) having the first hole portion 53 is used, the dimensional accuracy of the ferrule 38 can be improved.

In the mode shown in FIG. 22, the coating-removing component 69 in which the second hole portion 55 is formed is fitted into the fitting hole 68 of the ferrule body 67 in which the first hole portion 53 is formed, whereby the coating-receiving portion 57 is defined between the tip end face 69a of the coating-removing component 69, and the bottom face 68a of the fitting hole 68.

By simply fitting the coating-removing component 69 in which the second hole portion 55 is formed, into the fitting hole of the ferrule body 67, namely, the ferrule 38 can easily obtain the first hole portion 53, coating-receiving portion 57, and second hole portion 55 which have different diameters.
(Seventh Embodiment)

The configuration where the first hole portion 53 and second hole portion 55 which constitute the optical fiber holding hole 37 are formed in separate components is not restricted to the mode shown in FIG. 22.

Figure 23:
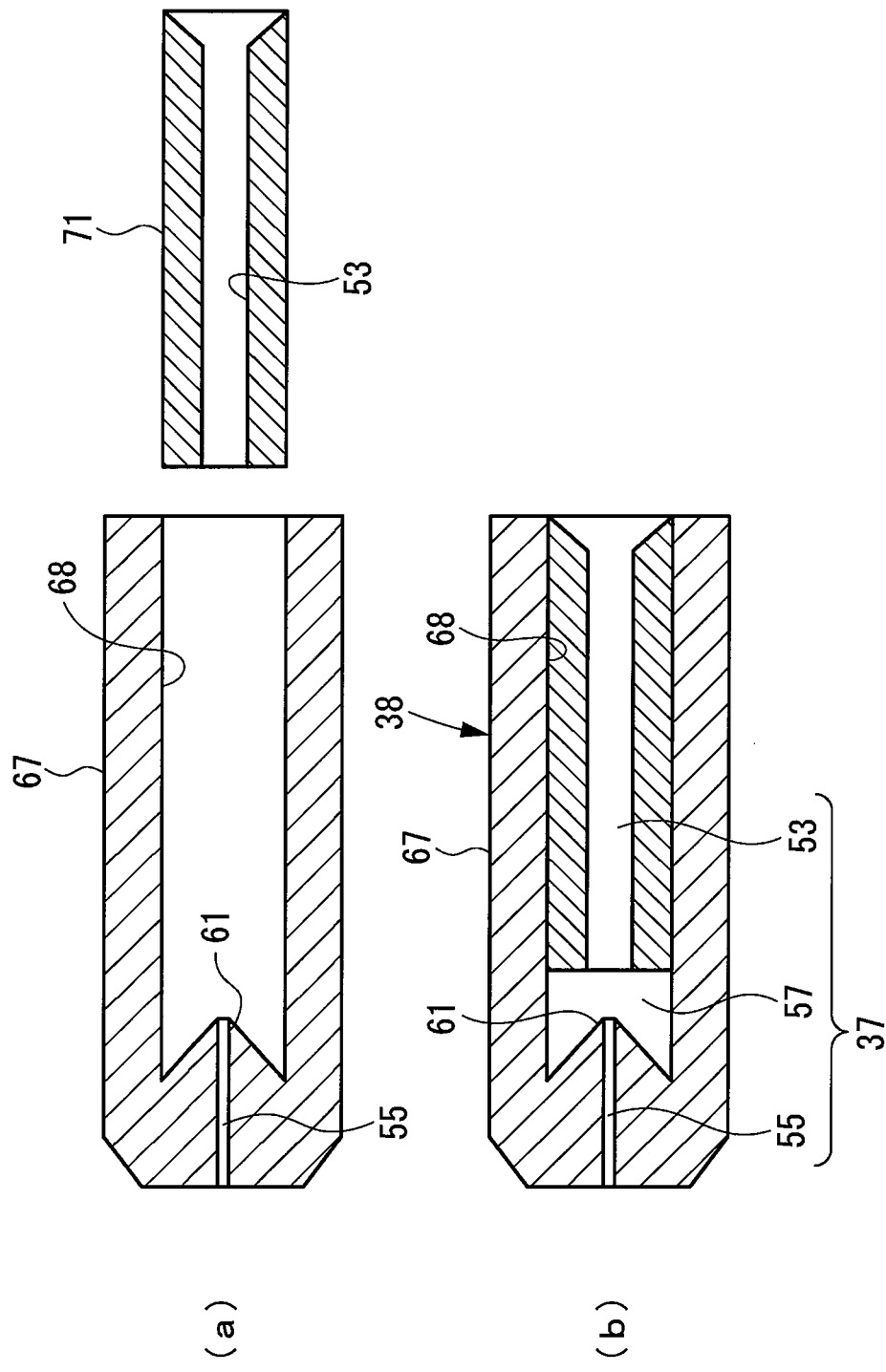
FIG. 23 is a diagram of another embodiment of the ferrule used in the optical connector of the invention.

As shown in FIG. 23, the ferrule 38 may be configured by: the ferrule body 67 in which the second hole portion 55 is passingly formed in the tip end side, and the fitting hole 68 having a large diameter is formed in the rear end side; and a cylindrical tubular member 71 in which the first hole portion 53 is passingly formed, and which is fitted into the fitting hole 68.

In this case, the coating-removing portion 61 is formed in the end portion of the second hole portion 55 formed in the ferrule body 67, and, when the tubular member 71 is fitted into the fitting hole 68 of the ferrule body 67 as shown in FIG. 23(b), the coating-receiving portion 57 is defined between the tip end portion of the tubular member 71 and the coating-removing portion 61.

Figure 24:
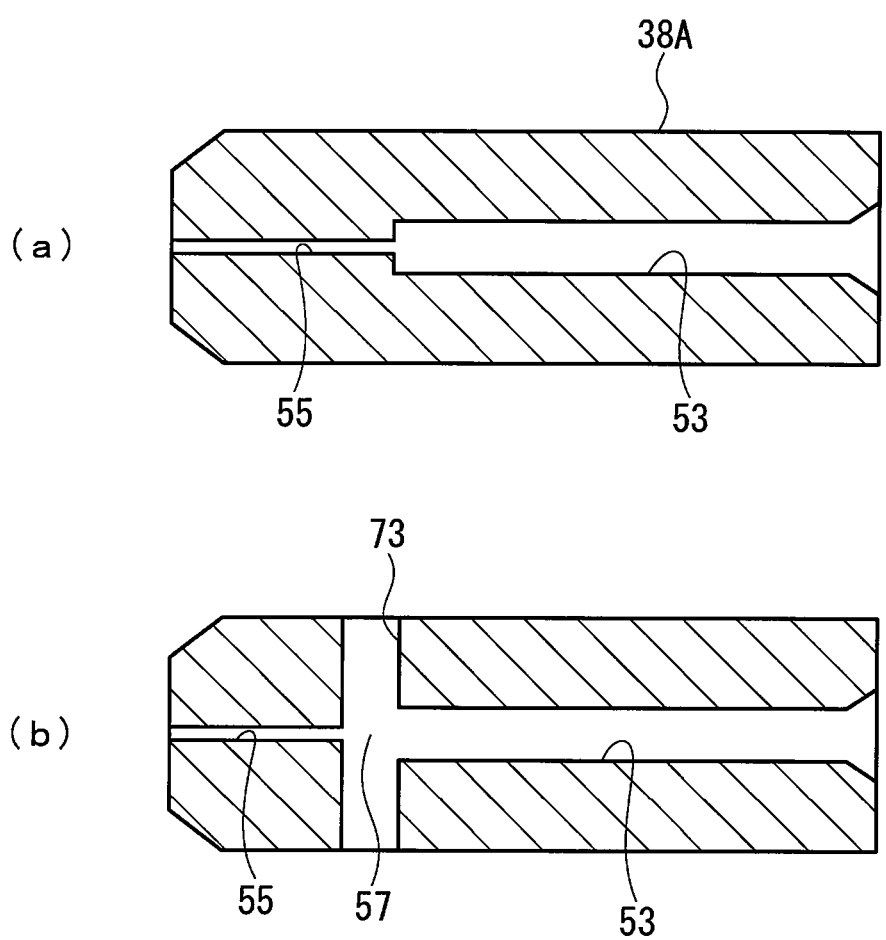
FIG. 24 is a diagram of a method in which a coating-receiving portion in a ferrule used in the optical connector of the invention is formed by a vertical hole forming process.

FIG. 24 is a diagram of a method in which the coating-receiving portion in the ferrule used in the optical connector of the invention is formed by a vertical hole forming process that can be performed in a subsequent step.

In this case, first, the first hole portion 53 and second hole portion 55 which constitute the optical fiber holding hole 37 are passingly formed in a member 38A which will be formed as the ferrule 38 as shown in FIG. 24(a).

Next, between the first hole portion 53 and the second hole portion 55 on the member 38A, a vertical hole 73 which perpendicularly intersects with the hole portions 53, 55 is passingly formed as shown in FIG. 24(b), and the space provided by the vertical hole 73 is used as the coating-receiving portion 57.

Figure 25:
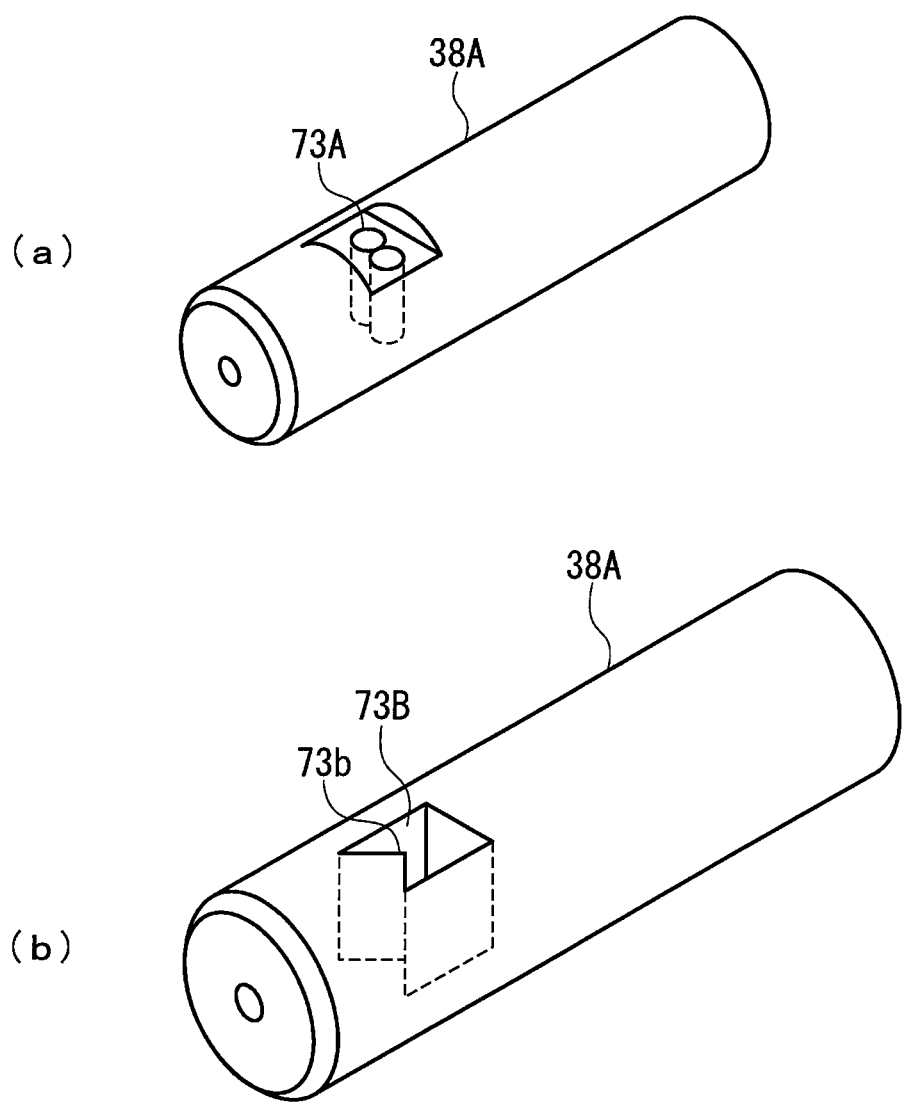
FIG. 25 is a view illustrating a structure example of the coating-receiving portion formed by the vertical hole forming process shown in FIG. 24.
Figure 26:
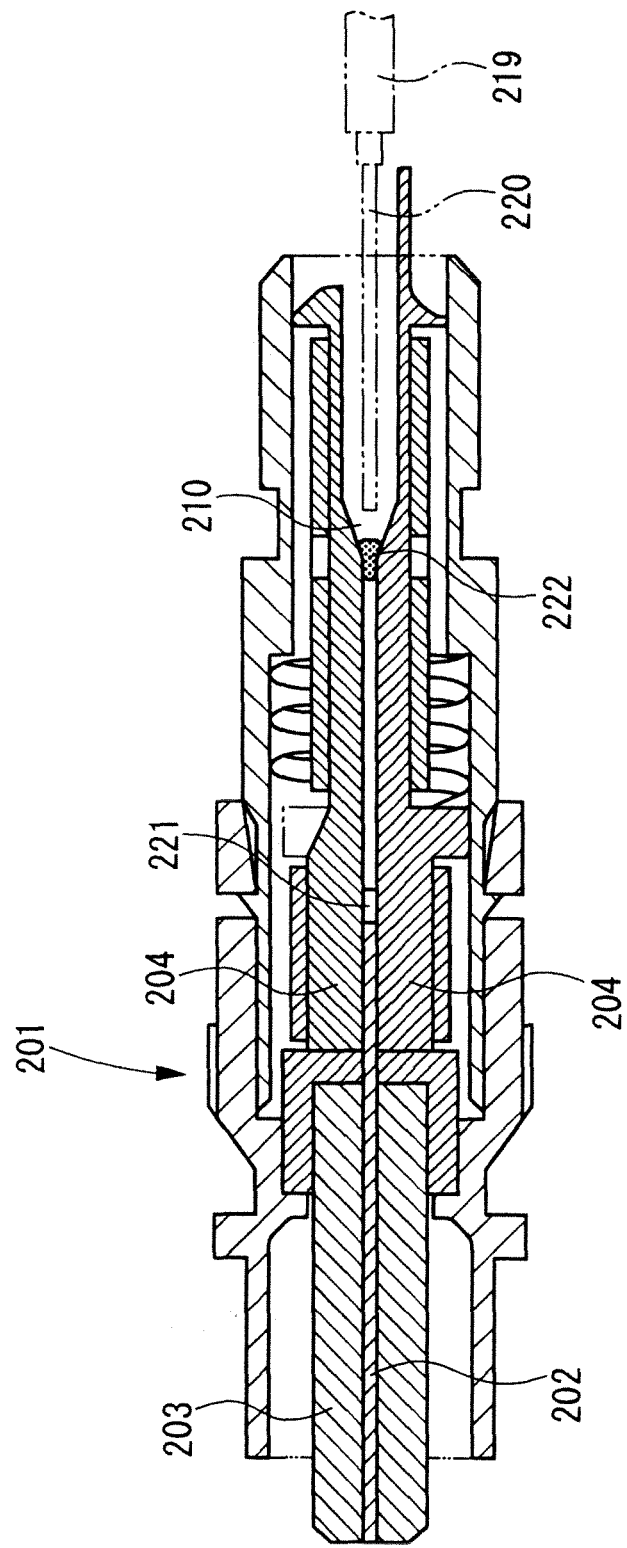
FIG. 26 is a longitudinal sectional view showing an example of a conventional optical connector which is to be attached to the tip end of a coated optical fiber.

As shown in FIG. 25(a), the vertical hole 73 which is formed in the member 38A may be formed by a drilling process as two continuous round holes 73A which are made continuous to each other. Alternatively, the hole may be formed by molding as a molded hole 73B which has a middle bent portion 73b, and an acute-angled form which will be used as the coating-removing portion 61 may be provided.

According to the configuration, the coating-receiving portion 57 can be formed in subsequent processing. In the case where the member 38A which will be used as the base material of the ferrule is formed by injection molding, it is possible to prevent the structure of a molding die for processing the coating-receiving portion 57 from being complicated, and the productivity can be improved.

Although the invention has been described in detail and with reference to the specific embodiments, it is obvious to those skilled in the art that various changes and modifications can be made without departing from the spirit and scope of the invention. The application is based on Japanese Patent Application (No. 2007-300539) filed Nov. 20, 2007, and its disclosure is incorporated herein by reference.

The invention claimed is:

1. An optical connector which is to be attached to a coated optical fiber, said optical connector comprising:
   a ferrule into which a bare optical fiber is to be inserted, said bare optical fiber being obtained by peeling a coating of said coated optical fiber;
   a fixing portion which fixes said coated optical fiber; and
   a coating-removing portion which presses the end face of the coating in the end face of said coated optical fiber, then removes the coating from an end portion of said coated optical fiber, by means of a force of inserting said coated optical fiber into said optical connector.

2. An optical connector according to claim 1, wherein said coating-removing portion is an insertion port for said bare optical fiber in said ferrule.

3. An optical connector according to claim 2, wherein said insertion port has a diameter which is larger than an outer diameter of said bare optical fiber, and which is smaller than an outer diameter of said coating.

4. An optical connector according to claim 1, further comprising:
   a flexure space which can house said coated optical fiber in a state where said coated optical fiber is flexed, between said fixing portion and said coating-removing portion.

5. An optical connector according to claim 4, further comprising:
   a guide capillary which restricts a radial movement of said coated optical fiber, between said coating-removing portion and said flexure space.

6. An optical connector according to claim 1, wherein said ferrule includes an optical member which is to communicate with said inserted bare optical fiber.

7. An optical connector according to claim 6, wherein said optical member is a short optical fiber which is fixed to an inside of said ferrule.

8. An optical connector according to claim 6, wherein said optical member is a thin film which is disposed in an end portion of said ferrule.

9. An optical connector according to claim 1, wherein
   an optical fiber holding hole in which said coated optical fiber is to be passed and fixed is formed in said ferrule, and
   said optical fiber holding hole includes: a first hole portion which is to house said coated optical fiber; a second hole portion which is to house said bare optical fiber that is obtained by peeling the coating of said coated optical fiber; and a coating-receiving portion which is located between said first hole portion and said second hole portion, and which is to house the peeled coating.

10. An optical connector according to claim 9, wherein said coating-receiving portion is formed in a space which is larger than said first hole portion.

11. An optical connectors according to claim 9, wherein said coating-removing portion is formed in an end portion of said second hole portion which faces said coating-receiving portion.

12. An optical connector according to claim 11, wherein a tip end of said coating-removing portion is formed into an acute-angled shape.

13. An optical connector according to claim 9, wherein an inner circumferential face of an end portion of said second hole portion is a tapered face which is gradually inclined from an opening position having a dimension that is larger than an outer diameter of said bare optical fiber to be inserted into second hole portion, and that is smaller than an outer diameter of said coated optical fiber.

14. An optical connector according to claim 9, wherein said first hole portion and said second hole portion are formed in separate components, respectively.

15. An optical connector according to claim 14, wherein a coating-removing component in which said second hole portion is formed is fitted into a fitting hole of a body of said ferrule in which said first hole portion is formed, and said coating-receiving portion is formed between a tip end face of said coating-removing component and a bottom face of said fitting hole.

16. An optical connector according to claim 9, wherein said coating-receiving portion is formed in a space having a sectional shape in the form of a rectangle or a cross.

17. An optical connector according to claim 9, wherein, in said ferrule, said coating-receiving portion is formed by a vertical hole which perpendicularly intersects with said optical fiber holding hole between said first hole portion and said second hole portion.

18. A method of attaching an optical connector according to claim 1 to a coated optical fiber, said method comprising steps of:
inserting the coated optical fiber into said optical connector;
butting a tip end of said coated optical fiber against said coating-removing portion to peel a coating of a tip end side; and
inserting a bare optical fiber which is exposed by peeling the coating, into said ferrule.

19. A method of attaching an optical connector according to claim 9 to a coated optical fiber, said method comprising steps of:
inserting the coated optical fiber into said first hole portion of said optical fiber holding hole;
butting a tip end of said coated optical fiber against said coating-removing portion to peel a coating of a tip end side, and housing the peeled coating in said coating-receiving portion; and
inserting a bare optical fiber which is exposed by peeling the coating, into said second hole portion.

20. An optical connection member which is to be attached to a coated optical fiber, said optical connection member comprising:
a connecting portion into which a bare optical fiber that is obtained by peeling a coating of said coated optical fiber is to be inserted;
a fixing portion which fixes said coated optical fiber; and
a coating-removing portion which presses an end face of the coating in an end face of the coated optical fiber, and removes the coating from an end portion of said coated optical fiber, by means of a force of inserting said coated optical fiber into said optical connection member,
wherein said coating-removing portion is disposed on both axial sides of said connecting portion.

21. An optical connector according to claim 1, wherein:
the coating-removing portion is provided at the whole circumference of a insertion port for said bare optical fiber and abuts with the coating of the end portion of said coated optical fiber, and
removes the coating from the end portion of said coated optical fiber, by means of a force of inserting said coated optical fiber into said optical connector.

* * * * *

UNITED STATES PATENT AND TRADEMARK OFFICE
CERTIFICATE OF CORRECTION

| | | |
|---|---|---|
| PATENT NO. | : 8,480,311 B2 | Page 1 of 1 |
| APPLICATION NO. | : 12/670581 | |
| DATED | : July 9, 2013 | |
| INVENTOR(S) | : Kenichiro Ohtsuka et al. | |

It is certified that error appears in the above-identified patent and that said Letters Patent is hereby corrected as shown below:

On the Title Page

Item (73) Assignee should read: Sumitomo Electric Industries, Ltd., Osaka (JP); Nippon Telegraph and Telephone Corporation, Tokyo (JP)

Signed and Sealed this
Twenty-first Day of April, 2015

Michelle K. Lee
*Director of the United States Patent and Trademark Office*